United States Patent
Iwasaki et al.

(10) Patent No.: US 6,907,177 B2
(45) Date of Patent: Jun. 14, 2005

(54) LIGHT GUIDE CONTAINING LIGHT-SCATTERING PARTICLES ARRANGED TO REALIZE DESIRED LIGHT-OUTPUT EFFICIENCY AND METHOD FOR DESIGNING THE SAME

(75) Inventors: Osamu Iwasaki, Kanagawa-ken (JP); Hiroshi Hara, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 104 days.

(21) Appl. No.: 10/653,239

(22) Filed: Sep. 3, 2003

(65) Prior Publication Data
US 2004/0047579 A1 Mar. 11, 2004

(30) Foreign Application Priority Data

Sep. 6, 2002 (JP) ........................................ 2002-261933

(51) Int. Cl.[7] .................................................. G02B 6/10
(52) U.S. Cl. ........................................ 385/129; 385/130
(58) Field of Search .................................. 385/129, 130

(56) References Cited

U.S. PATENT DOCUMENTS 3,512,876 A * 5/1970 Marks ....................... 359/296
5,196,960 A * 3/1993 Matsuzaki et al. ........ 359/453
2003/0218180 A1 * 11/2003 Fujiwara ................... 257/100

FOREIGN PATENT DOCUMENTS

| JP | 10123350 A | 5/1998 |
|---|---|---|
| JP | 3162398 B2 | 2/2001 |
| JP | 3184219 B2 | 4/2001 |
| JP | 3215218 B2 | 7/2001 |

* cited by examiner

*Primary Examiner*—Brian Healy
*Assistant Examiner*—Charlie Peng
(74) *Attorney, Agent, or Firm*—Sughrue Mion, PLLC

(57) ABSTRACT

A light guide includes: an optical medium; and light-scattering particles each having a scattering cross section $\Phi$ and being contained in the optical medium with a density $N_p$ so that light which enters the light guide from a first end face can propagate to a second end face while being scattered by the light-scattering particles. In the light guide, the product of the scattering cross section $\Phi$, the density $N_p$, the length $L_G$ of the optical medium in the light propagation direction, and a correction coefficient $K_c$ is less than or equal to 0.9. Preferably, the product is less than or equal to 0.4 combining a plurality of optical mediums.

20 Claims, 30 Drawing Sheets

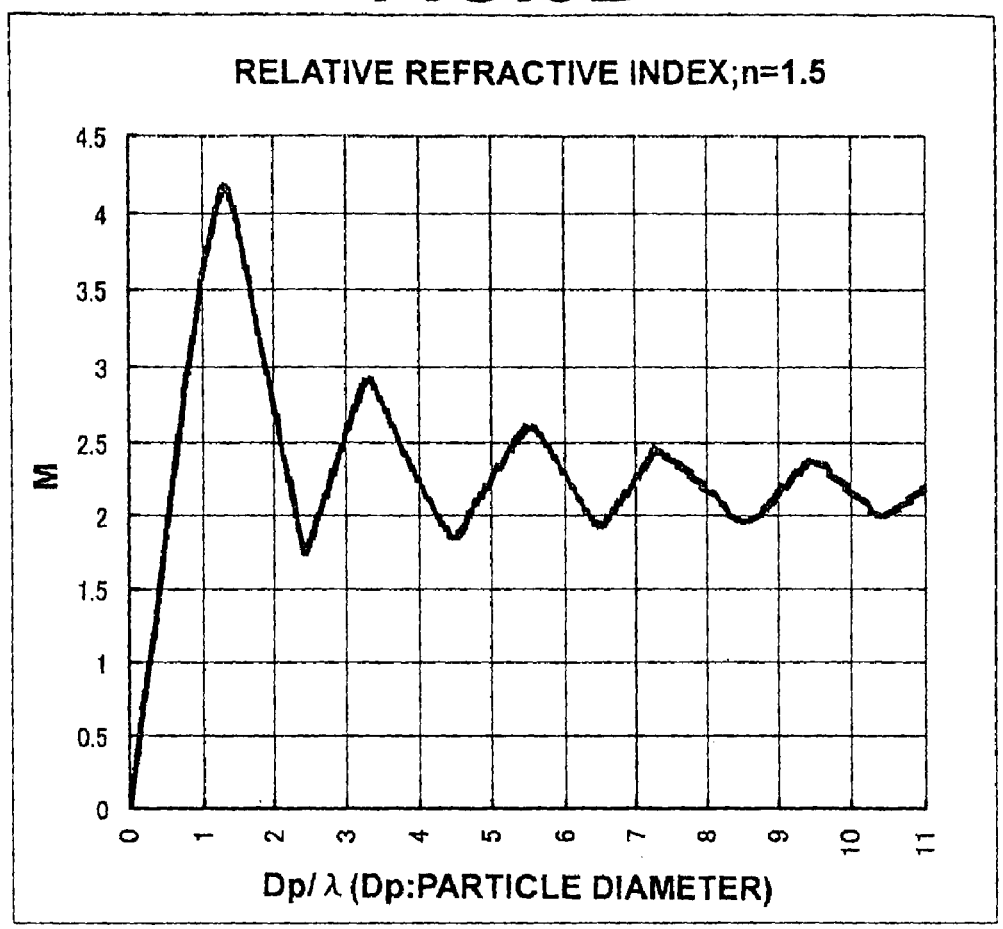

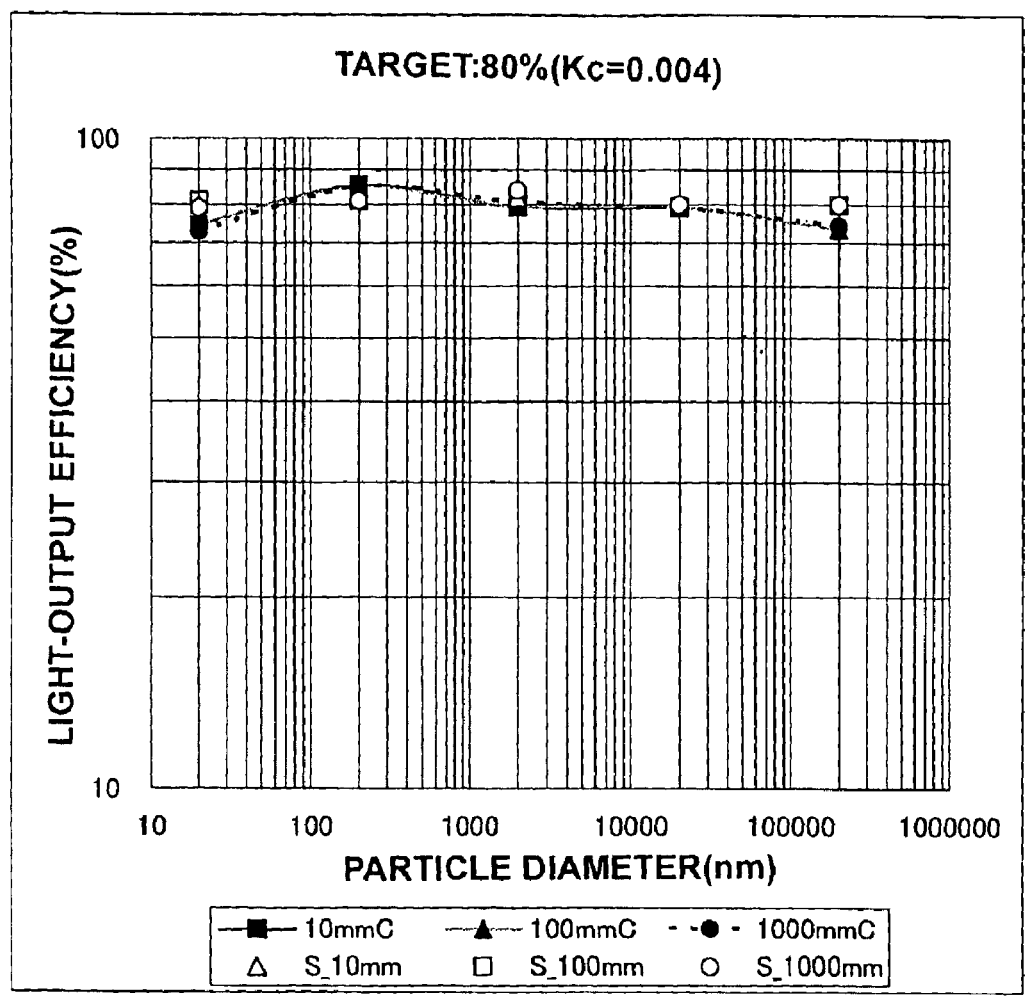

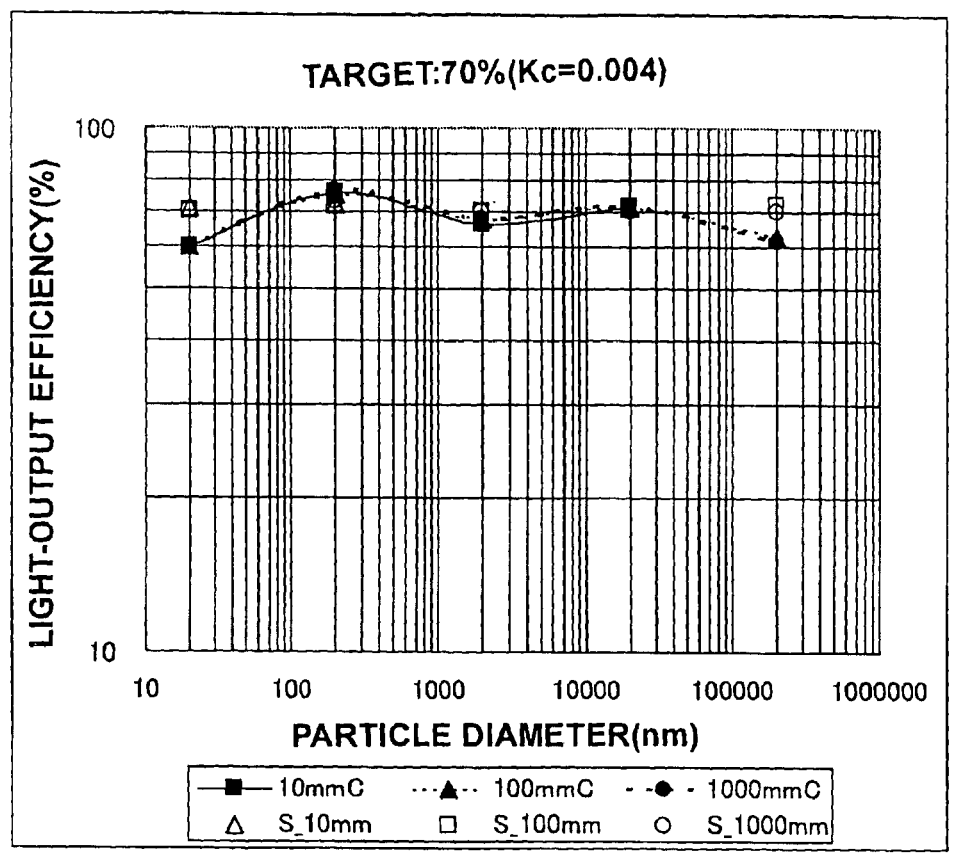

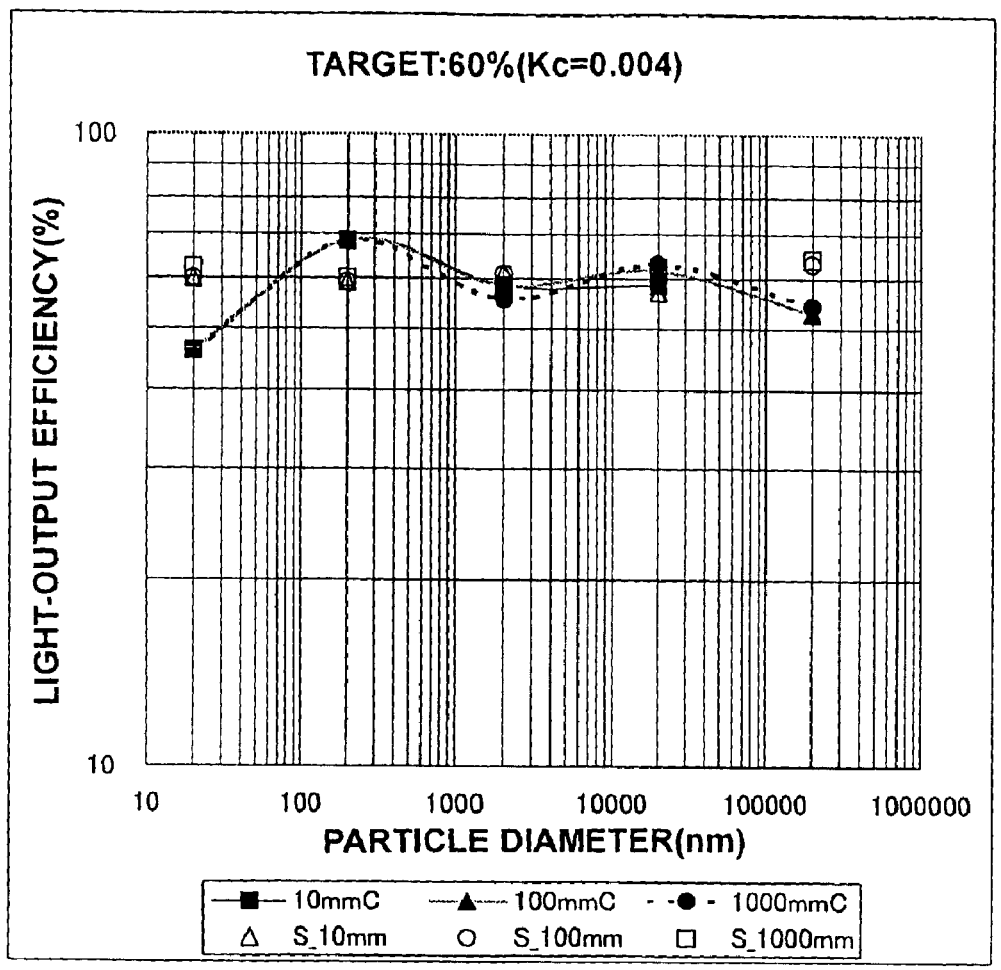

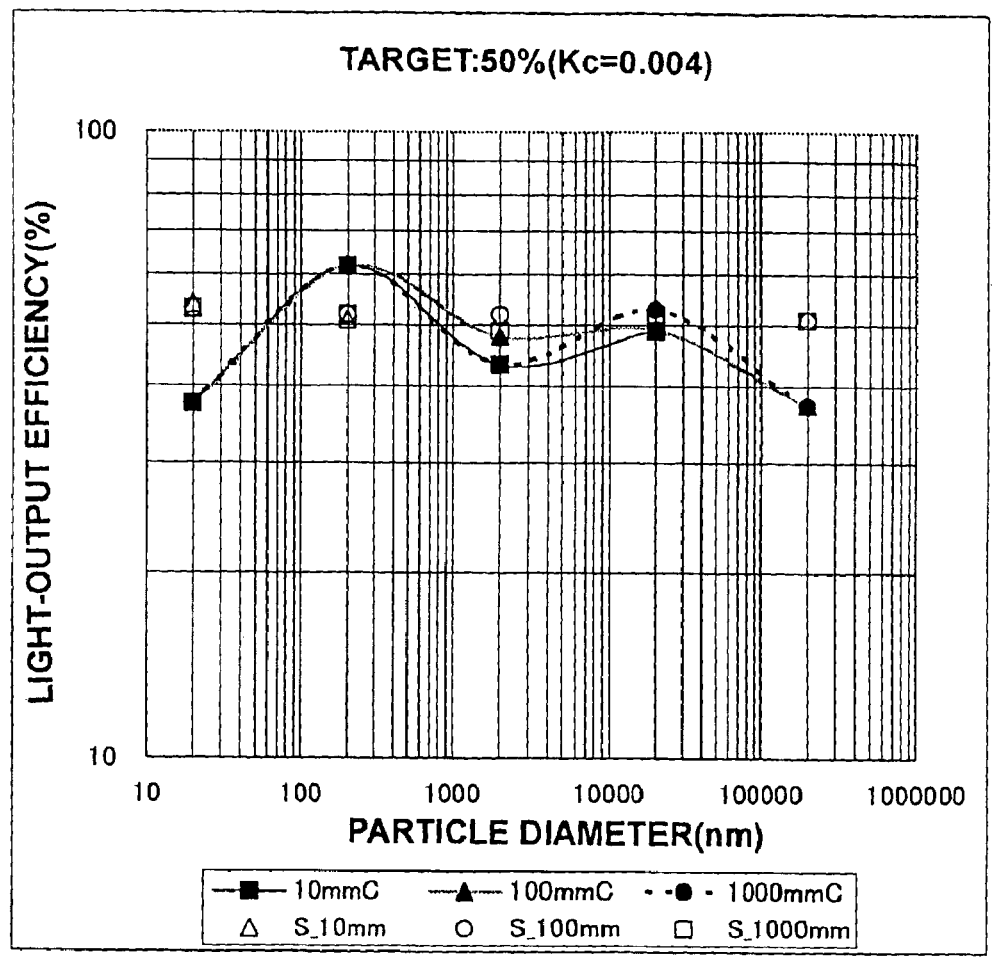

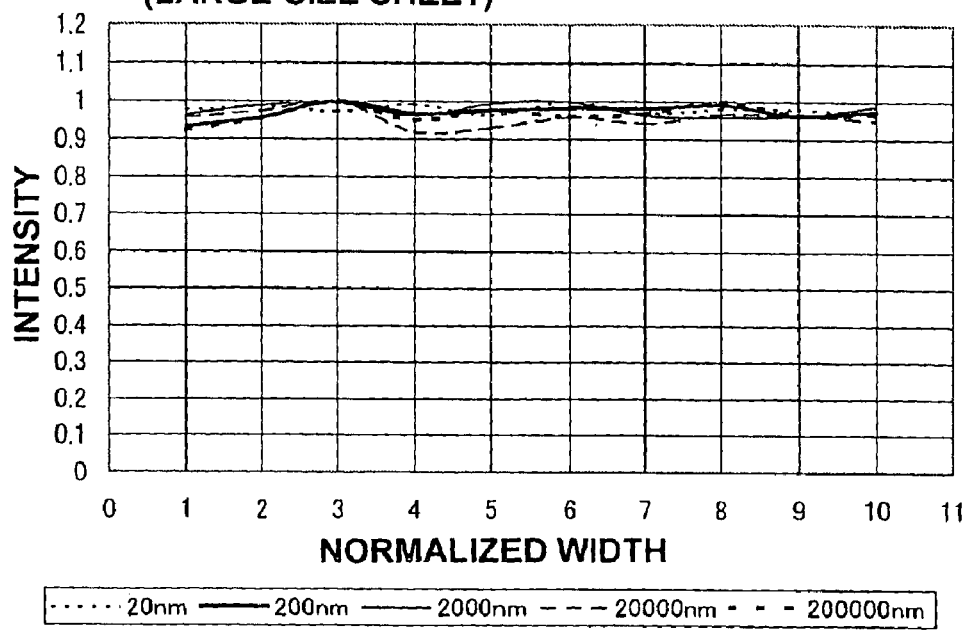

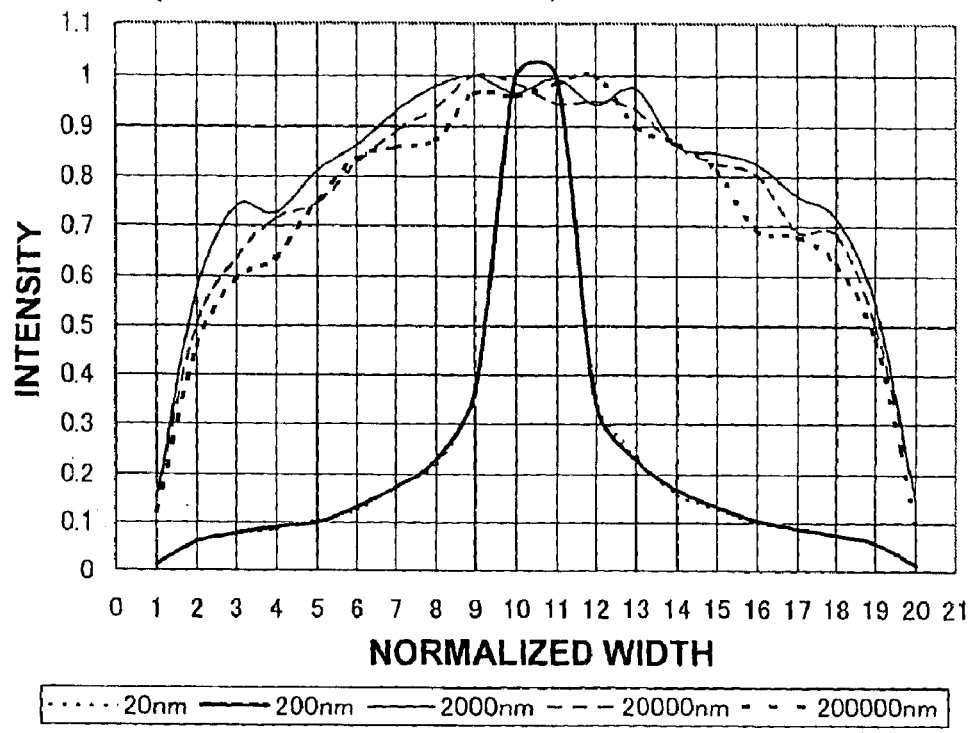

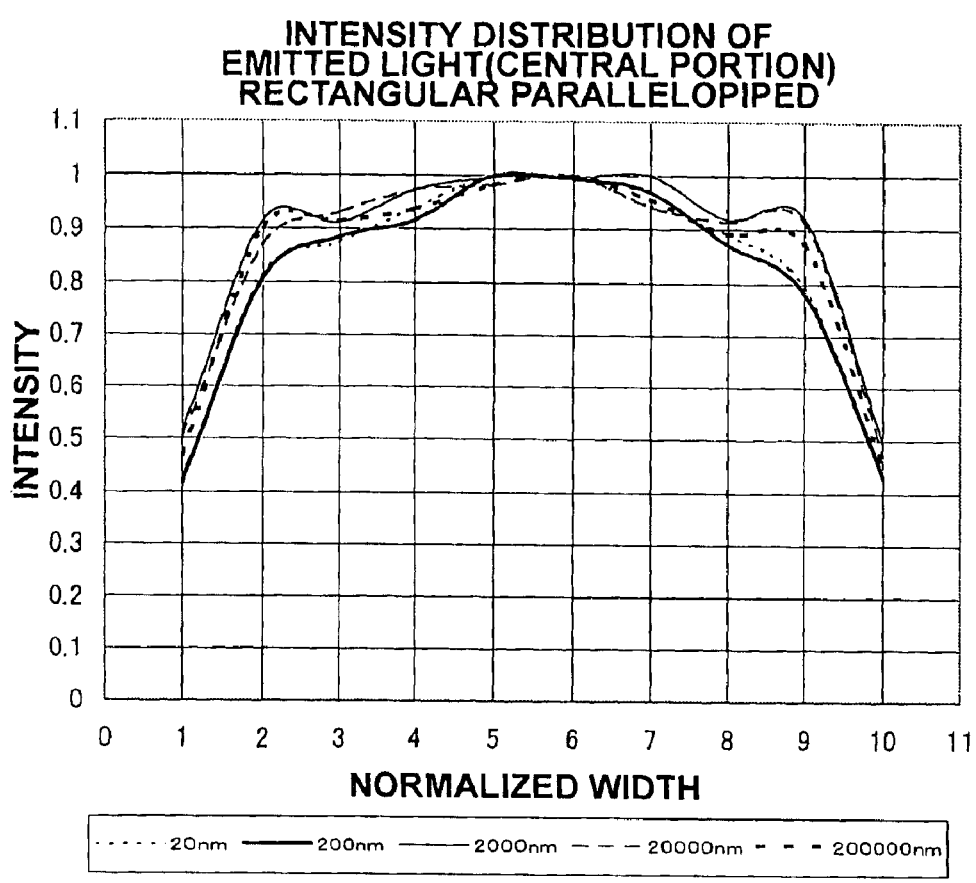
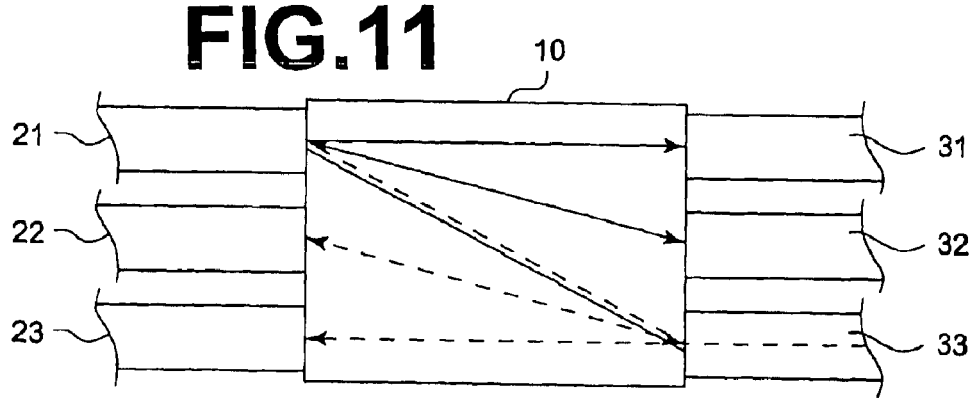

INTENSITY DISTRIBUTION OF EMITTED LIGHT (CENTRAL PORTION)
MIRROR BOX(PARTICLE DIAMETER:10 μm)

3-DIMENSIONAL INTENSITY DISTRIBUTION OF EMITTED LIGHT
MIRROR BOX(PARTICLE DIAMETER:10 μm)

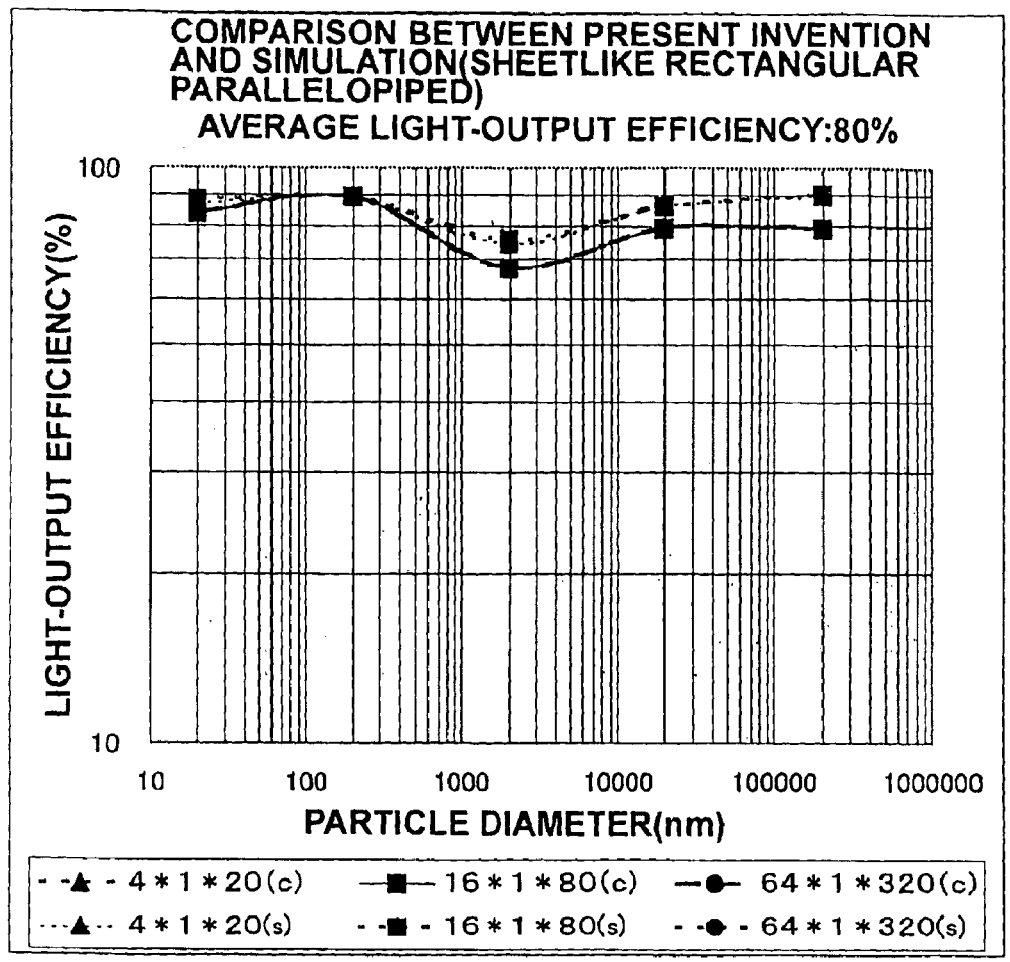

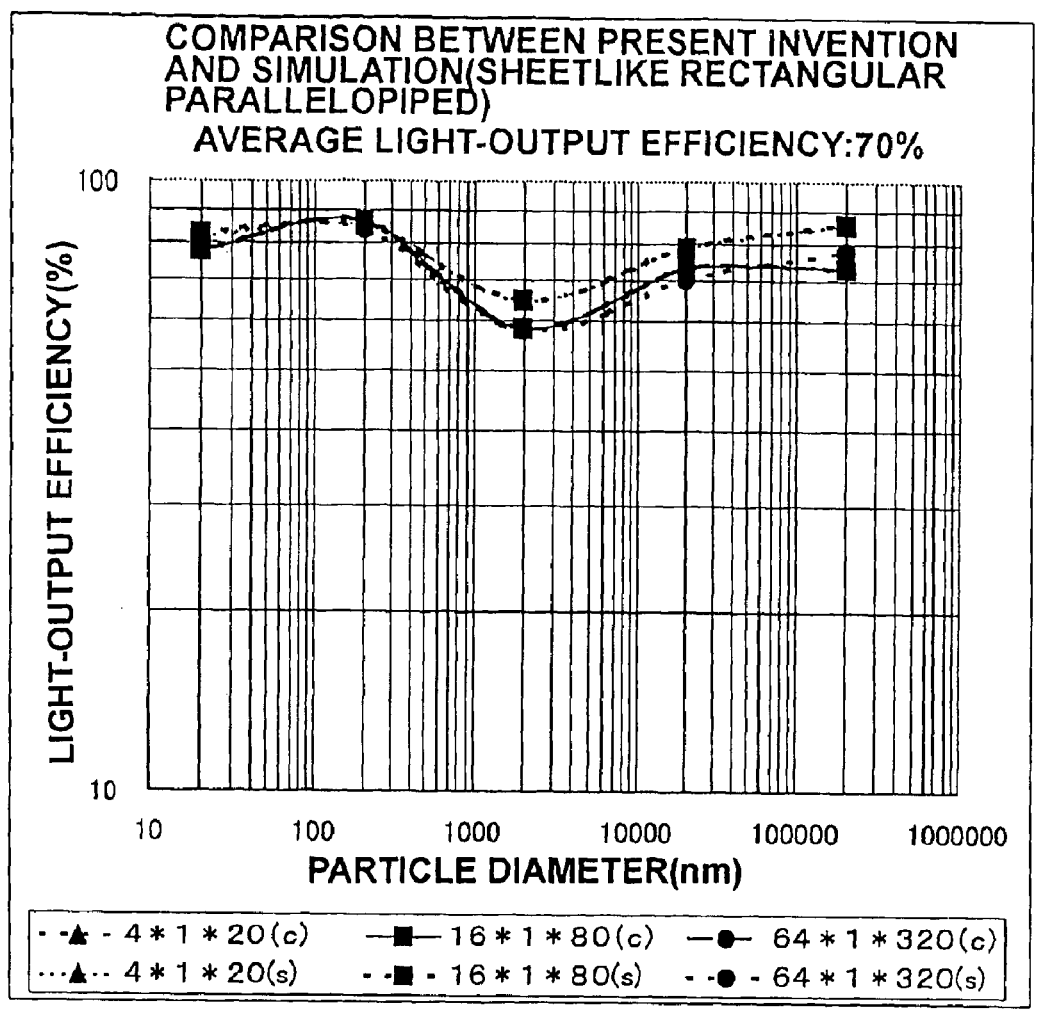

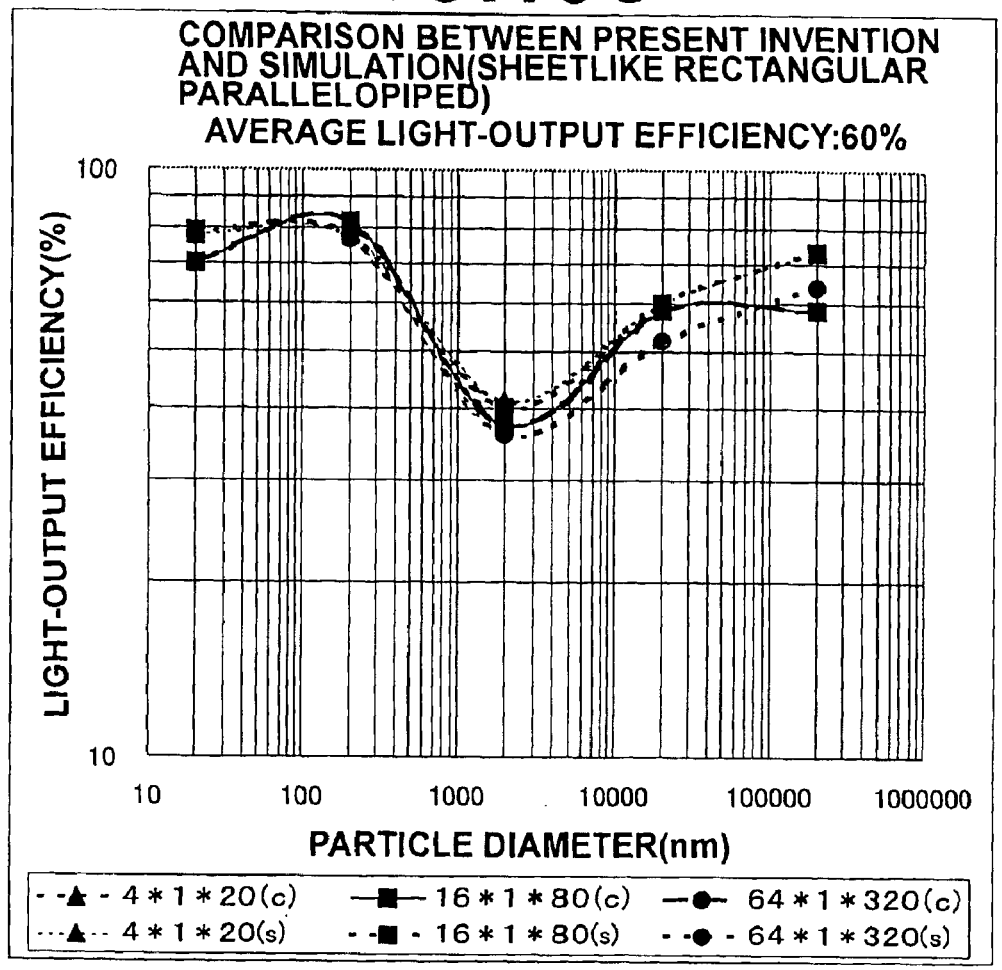

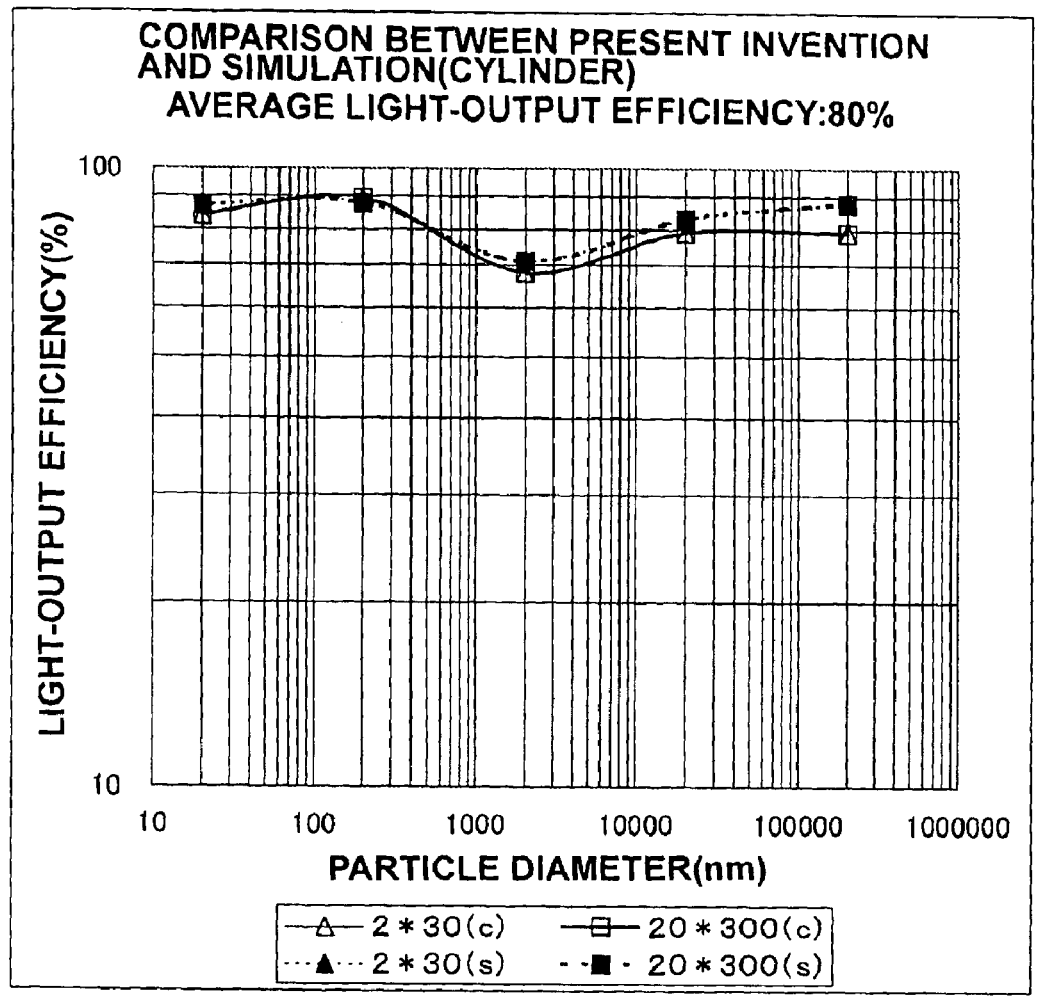

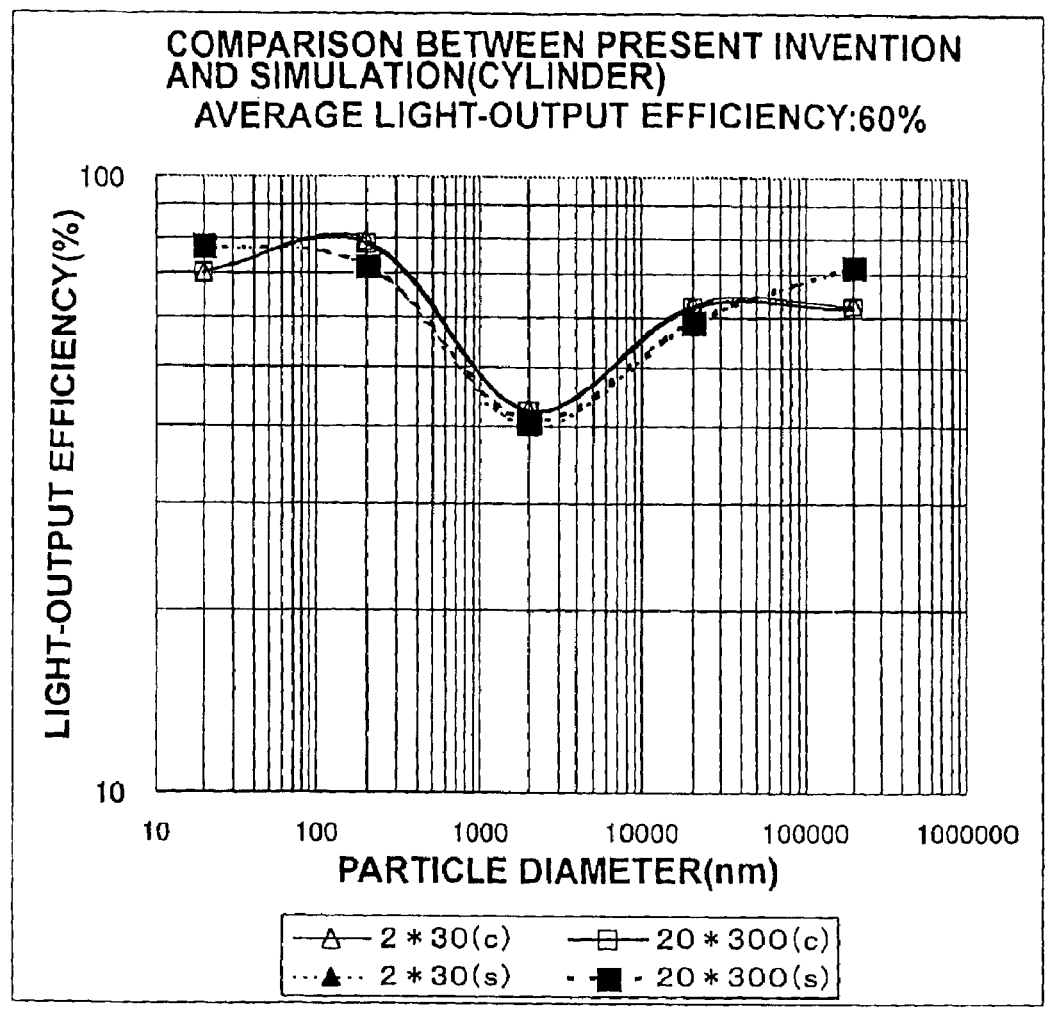

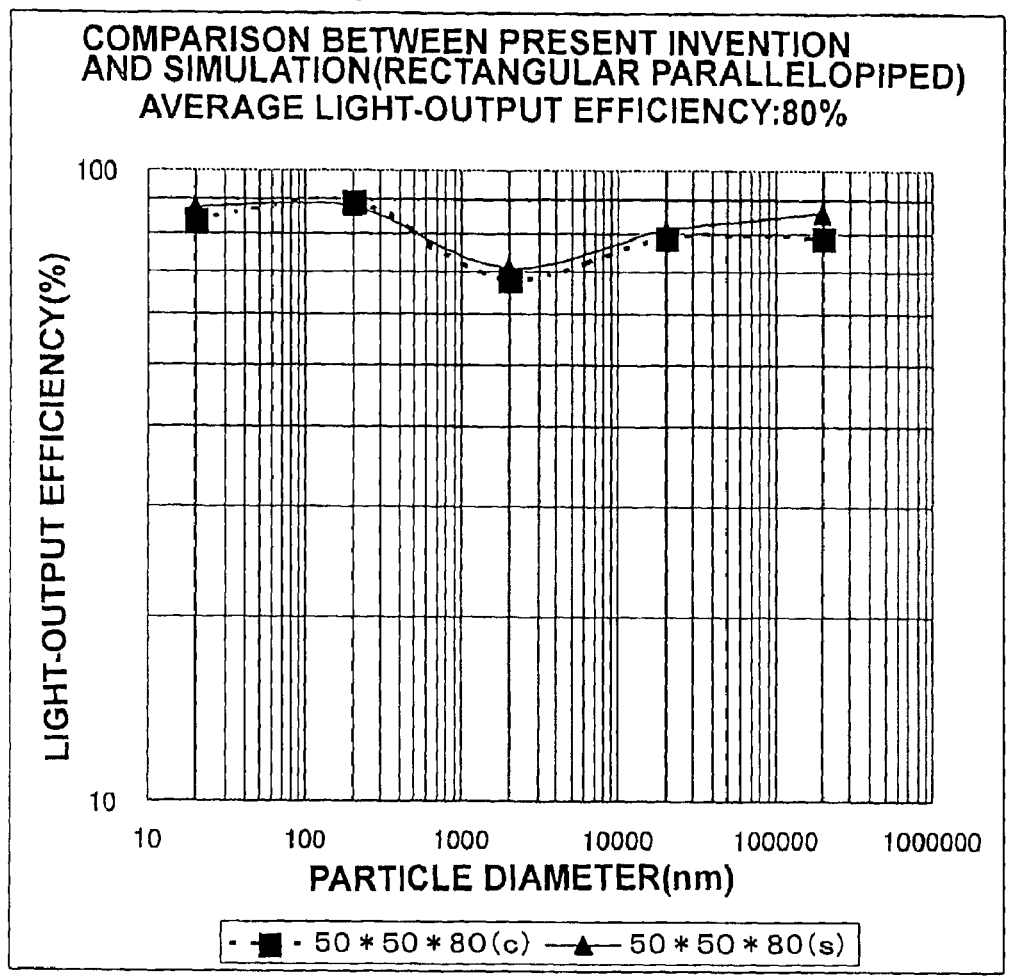

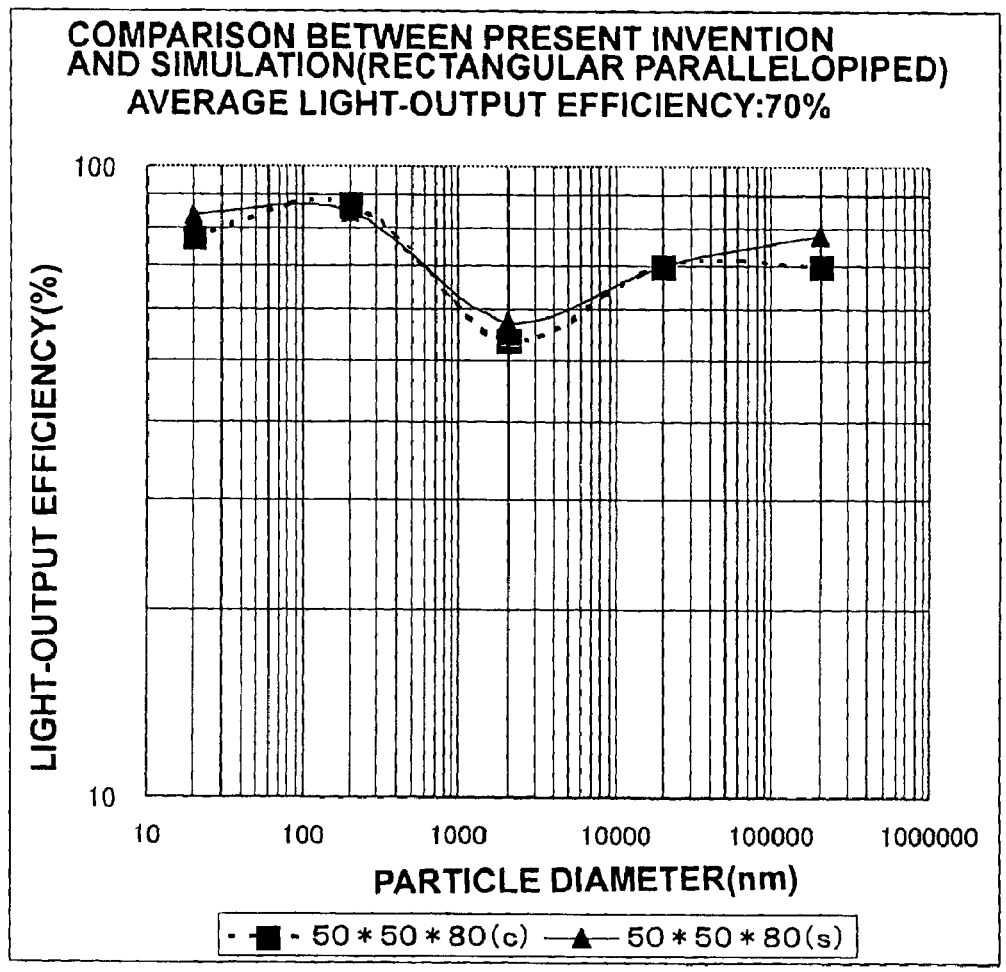

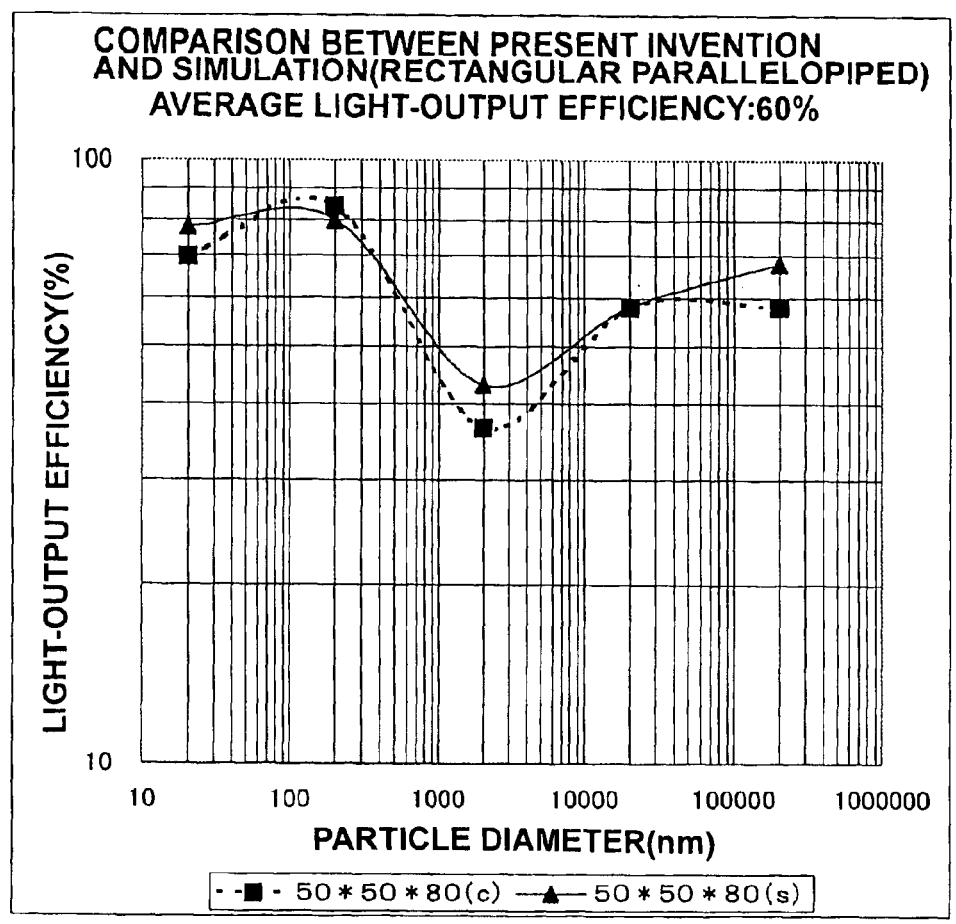

LIGHT GUIDE CONTAINING LIGHT-SCATTERING PARTICLES ARRANGED TO REALIZE DESIRED LIGHT-OUTPUT EFFICIENCY AND METHOD FOR DESIGNING THE SAME

BACKGROUND OF THE INVENTION

1. Field of the Invention

The present invention relates to a light guide in which light-scattering particles are contained in an optical medium so that light which enters the light guide from an end face can propagate to another end face while being scattered by the light-scattering particles. The present invention also relates to a method for designing the above light guide.

2. Description of the Related Art

The following documents (1) to (4) disclose information related to the present invention.

(1) Japanese Registered Patent No. 3162398 (pages 7 through 9 and FIG. 3)

(2) Japanese Registered Patent No. 3184249 (pages 9 through 11 and FIGS. 1 and 3)

(3) Japanese Registered Patent No. 3215218 (pages 10 through 11 and FIGS. 2 and 8)

(4) Japanese Unexamined Patent Publication NO. 10-123350 (pages 5 through 7 and FIGS. 3 through 6)

As indicated in documents (1) and (2), light guides in which light-scattering particles are contained in an optical medium such as PMMA (polymethyl methacrylate) so that light which enters the light guide from an end face can propagate to another end face while being scattered by the light-scattering particles are known.

In the above light guides, light propagates while repeating reflection by the light-scattering particles in the optical medium as well as total reflection at interfaces between side ends of each light guide and an ambient medium (e.g., air or a cladding layer) around the light guide. Therefore, it is possible to output light having a more uniform intensity from a light-emission end face, in comparison with the light guides in which light propagates without the reflection by the light-scattering particles.

In an application utilizing the above advantage, which has been considered as disclosed in document (4), an optical data bus is constructed by coupling an input unit to an end face of a light guide containing light-scattering particles as above so as to input an optical signal through the input unit, and coupling a plurality of output units to another end face of the light guide so as to deliver the optical signal as a common signal to the plurality of output units.

Further, as disclosed in documents (1) to (3), it has also been considered to use a light guide containing light-scattering particles as described above for generating uniform illumination light with satisfactory light propagation efficiency in a liquid crystal display device or the like.

Conventionally, it is impossible to easily obtain a design condition which realizes a desired light-output efficiency and a uniform emission-intensity distribution. Therefore, for example, the following methods (a) and (b) are used.

(a) In the first method, in order to obtain a light guide having desired characteristics, a plurality of samples of a light guide respectively having different diameters and densities of particles contained in optical mediums are produced, and one of the samples which realizes a desired light-output efficiency and a uniform emission-intensity distribution is chosen for use.

(b) In the second method, a design condition is determined by extensive simulation using a computer system.

SUMMARY OF THE INVENTION

The present invention has been developed in view of the above circumstances.

The first object of the present invention is to provide a method for designing a light guide, by which a light guide having a desired characteristic can be easily designed.

The second object of the present invention is to provide a light guide having a satisfactory light-output efficiency and a uniform emission-intensity distribution.

In order to accomplish the first object, the first aspect of the present invention is provided. According to the first aspect of the present invention, there is provided a method for designing a light guide in which light-scattering particles are contained in an optical medium so that light which enters the light guide from a first end face can propagate to a second end face while being scattered by the light-scattering particles. The method comprises the steps of: (a) determining a desired value of a light-output efficiency of the light guide; and (b) determining values of a scattering cross section $\Phi$ of each of the light-scattering particles, a density $N_p$ of the light-scattering particles in the optical medium, and a length $L_G$ of the optical medium in a light propagation direction so as to satisfy a relationship, $$E_{out} = \exp\{-(\Phi \cdot Np - L_G \cdot K_c)\} \cdot K_L,$$

where $K_c$ and $K_L$ are a correction coefficient and a loss coefficient of the light guide, respectively.

According to the first aspect of the present invention, it is possible to easily design a light guide having desired optical characteristics.

In addition, in order to accomplish the second object, the second aspect of the present invention is provided. According to the second aspect of the present invention, there is provided a light guide comprising: an optical medium having first and second end faces and a length $L_G$ in a light propagation direction; and light-scattering particles each having a scattering cross section $\Phi$ and being contained in the optical medium with a density $N_p$ so that light which enters the light guide from the first end face can propagate to the second end face while being scattered by the light-scattering particles. In the light guide according to the second aspect of the present invention, the product of the scattering cross section $\Phi$, the density $N_p$, the length $L_G$, and a correction coefficient $K_c$ is less than or equal to 0.9.

When the value of $\Phi \cdot Np \cdot L_G \cdot K_c$ is 0.9 or smaller, the value of the light-output efficiency calculated according to the present invention becomes within 50% of a result of a corresponding fine-grained simulation. In the case where simulation is performed or prototypes are produced, it is considered that a difference of about 50% between the value of the light-output efficiency calculated according to the present invention and the result of the corresponding fine-grained simulation does not cause a problem in aiming at a desired value of the light-output efficiency.

Preferably, the light guide according to the second aspect of the present invention may also have one or any possible combination of the following additional features (i) to (vi).

(i) The product, $\Phi \cdot N_p \cdot L_G \cdot K_c$ is less than or equal to 0.4.

When the value of $\Phi \cdot Np \cdot L_G \cdot K_c$ is 0.4 or smaller, the value of the light-output efficiency calculated according to the present invention is within 10% of a result of a corresponding fine-grained simulation. When the difference is less than 10%, it is possible to achieve a satisfactory light-output efficiency and a uniform intensity distribution of emitted light. Therefore, it is unnecessary to perform simulation, or estimate and narrow down samples, and thus the development efficiency is increased.

(ii) Light incident in the optical medium is repeatedly reflected at the surfaces thereof except at the first and second end faces according to Snell's Law; the refractive index of the optical medium is designated as Nm, the refractive index of the ambient medium is designated as Ns, the incident angle is designated as θm, and the angle of refraction is designated as θs; and in the case that the optical medium does not contain the light scattering particles, if Nm·sin θm=Ns·sin θs, then the optical medium is formed to be of a shape so as to satisfy the condition, sin θs>1.

(iii) Light that is emitted from at least one of the light emitting end faces is reflected and refracted at the light emitting end face according to Snell's Law; the refractive index of the optical medium is designated as Nm, the refractive index of the ambient medium is designated as Ns, the incident angle is designated as θm, and the angle of refraction is designated as θs; and in the case that the optical medium does not contain the light scattering particles, if Nm·sin θm=Ns·sin θs, then the optical medium is formed to be of a shape so as to satisfy the condition, sin θs>1.

(iv) The light-scattering particles are non-magnetic conductive particles which behave in accordance with Mie's scattering theory.

(v) The density of the light-scattering particles gradually varies in the optical medium.

(vi) The optical medium is realized by combining a plurality of optical mediums.

PRINCIPLES AND ADVANTAGES OF THE INVENTION

The aforementioned documents (1) and (2) have disclosed light guides which are produced by arrangement of a nonuniform-refractive-index structure or mixture and dispersion of dielectric particles into an optical medium so as to realize a desired light-intensity distribution. In addition, documents (1) and (2) disclose that when the Debye's turbidity theory (Journal of Applied Physics, Vol. 20 (1949) pp. 518–525) is utilized, the intensity of scattered light can be increased, and the light-intensity distribution at a light-emission end can be uniformed. In particular, Debye cites a consideration on scattered light from a paper by Albert Einstein ("Theory of Thermal Variations in a Dielectric Constant in Gas or Liquid," Annalen der Physik 33 (1910) pp. 1275–1298). Debye cites the following equation, $$i/I_0 = (RT/N) \cdot [(\varepsilon-1)^2(\varepsilon+2)^2/P] \cdot (2\pi/\lambda)^4 \cdot [V/(4\pi D)^2]\cos^2\theta, \quad (1)$$

where i is a light intensity at a distance D from a light scatterer, $I_o$ is an intensity of incident light, R is the gas constant, T is an absolute temperature, N is the number of molecules per mole, $\varepsilon$ is the square of a refractive index at a wavelength λ (a dielectric constant), P is a pressure applied on fluid, λ is the wavelength, V is the volume of the light scatterer, D is the distance between the light scatterer and an observation point, and θ is a scattering angle.

The above equation by Einstein is modified by Debye into the following equation, $$i/I = <\eta>^2/\varepsilon^2(\pi^2 V/\lambda^4 D^2)\cdot(1+\cos^2\theta)/2\cdot\omega, \quad (2)$$

where i is the light intensity at the distance D from the light scatterer, $I_0$ is the intensity of incident light, $\varepsilon$ is the dielectric constant, $<\eta>^2$ is a squared average of variations in the dielectric constant of the light scatterer, D is the distance between the light scatterer and an observation point, λ is the wavelength, V is the total volume of the light scatterer, θ is the scattering angle, and ω is a correlation volume. In addition, the correlation volume ω is expressed as $$\omega = 4\pi \int \sin(ksr)/ksr \cdot r^2 \gamma(r)dr, \quad (3)$$

where k is a wave number, s is the length of a synthesized vector of a unit vector of the incident light and a unit vector of outgoing light (i.e., s=2 sin(θ/2)), and r is a distance between two points between which the dielectric constant varies.

According to Debye, the correlation volume ω can be integrated when the correlation function γ(r) is expressed as γ(r)=exp(−r/a), where a is a correlation distance. Therefore, the equation (3) can be expressed as $$\omega = 8\pi a^3/(1+k^2 s^2 a^2)^2. \quad (4)$$

Then, the following equation can be derived from the equations (2) and (4).

$$i/I = <\eta>^2/\varepsilon^2(\pi^2 V/\lambda^4 D^2)\cdot(1+\cos^2\theta)/2\cdot 8\pi a^3/(1+k^2 s^2 a^2)^2.$$

Further, when the definition of s (s=2sin(θ/2)) is used, the above equation becomes $$i/I = 4\pi a^3 <\eta>^2/\varepsilon^2(\pi^2 V/\lambda^4 D^2)\cdot \quad (5)$$
$$(1+\cos^2\theta)/(1+8\pi^2/(1-\cos\theta)(a/\lambda)^2)^2.$$

The factor indicating the angular dependence of scattered light in the right side of the equation (5) is extracted as $$f(\theta)=(1+\cos^2\theta)/(1+8\pi^2(1-\cos\theta)(a/\lambda)^2)^2. \quad (6)$$

FIG. 1 shows angular distributions of scattered light obtained by calculating the factor f(θ) expressed by the equation (6) for each of representative values of a/λ, and FIG. 2 shows angular distributions of scattered light calculated based on Mie's scattering theory for each of representative values of the particle diameter Dp.

According to documents (1), (2), and (3), it is possible to consider that the particle diameter is almost equal to the correlation distance. Therefore, as illustrated in FIG. 1, when the particle diameter is equivalent to the wavelength, the intensity of the forward scattered light increases. In addition, when the particle diameter exceeds ten times the wavelength, the intensity of the laterally scattered light remarkably increases, and substantially no light is scattered forward. On the other hand, according to Mie's scattering theory, as illustrated in FIG. 2, the intensity of the forward scattered light is still great even when the particle diameter exceeds ten times the wavelength. In the case where γ(r) is approximated by exp(−r/a), although the intensities obtained by the Debye's turbidity theory are near to the intensities obtained by Mie's scattering theory for the particle diameters equivalent to the wavelength, the intensities obtained by the Debye's turbidity theory are greatly different from the intensities obtained by Mie's scattering theory for the particle diameters substantially greater than the wavelength.

According to the above consideration, Mie's scattering theory is more appropriate as a calculation method used for designing a light guide which outputs incident light with a uniform intensity distribution, since Mie's scattering theory represents Rayleigh scattering when the particle size is considerably small compared with the wavelength, and Huygens-Fresnel diffraction when the particle size is considerably great compared with the wavelength. Further, since Mie's scattering theory is provided for a single-particle system, it is considered that analysis of a multiparticle system based on Mie's scattering theory is necessary for scattering by multiple particles.

In the method for designing a light guide according to the present invention, improvement is made so that a design condition of a light guide having a desired light-output efficiency can be easily obtained. Hereinbelow, the method according to the present invention is explained in detail.

<Scattering Cross Section>

First, the scattering cross section $\Phi$ is explained below.

The concept of the scattering cross section is widely used in various theories as well as Mie's scattering theory for electromagnetic waves in the radiation-wavelength ranges (such as $\gamma$ rays and X rays) and longer-wavelength ranges (such as infrared and microwaves) as well as the visible light. In the case where the relation between the particle diameter and the wavelength belongs to the range of the Rayleigh scattering, the scattering cross section $\Phi$ is expressed as $$\Phi = 128\pi^5 \cdot (a_P^6/3\lambda^4) \cdot \{(n^2-1)/(n^2+2)\}^2, \quad (7)$$

where $a_P$ is a particle radius, $\lambda$ is the wavelength of incident light, and n is a relative refractive index.

On the other hand, according to Mie's scattering theory, the scattering cross section $\Phi$ is expressed as $$\Phi = (\lambda^2/2\pi) \sum_{n=1}^{\infty} (2n+1) \cdot [|a_n|^2 + |b_n|^2], \quad (8)$$

where $\lambda$ is the wavelength of the incident light, $$a_n = \frac{\varphi_n(\alpha) \cdot \varphi'_n(\beta) - N \cdot \varphi_n(\beta) \cdot \varphi'_n(\alpha)}{\zeta_n(\alpha) \cdot \varphi'_n(\beta) - N \cdot \varphi_n(\beta) \cdot \zeta'_n(\alpha)},$$

$$b_n = \frac{N \cdot \varphi_n(\alpha) \cdot \varphi'_n(\beta) - \varphi_n(\beta) \cdot \varphi'_n(\alpha)}{N \cdot \zeta_n(\alpha) \cdot \varphi'_n(\beta) - \varphi_n(\beta) \cdot \zeta'_n(\alpha)},$$

$\phi_n(kr) = (\pi kr/2) \cdot J_{n+1/2}(kr)$,
$J_{n+1/2}(kr)$ is the Bessel function of the first kind,
k is the wave number ($2\pi/\lambda$),
r is the radius in the polar coordinate system,
$\phi'_n$ is a derivative of $\phi_n$,
$\zeta_n(kr) = \phi_n(kr) + i \cdot \chi_n(kr)$,
$\chi_n(kr) = -(\pi kr/2) \cdot N_{n+1/2}(kr)$,
$N_{n+1/2}(kr)$ is the Neumann's Bessel function of the second kind,
$\zeta'_n$ is a derivative of $\zeta_n$,
$\alpha = 2\pi a/\lambda$, and
$\beta = N \cdot \alpha$.

When the value of $a/\lambda$ in the equation (8) is increased to the limit (i.e., $a/\lambda \gg 1$), the scattering cross section $\Phi$ becomes $$\Phi = M\pi a_P^2, \quad (9)$$

where $M \approx 2$ when the right side of the equation (8) converges. In addition, it is known that the value of M oscillates between 1 and 6 (i.e., $1 < M < 6$) when $2\pi a_P/\lambda \approx 1$.

FIGS. 3A, 3B, and 3C show oscillations of the value M in the cases where the relative refractive indexes are 1.1, 1.5, and 2.1, respectively. As indicated in FIGS. 3A, 3B, and 3C, the scattering cross section $\Phi$ oscillates and gradually converges with increase in the particle diameter Dp. That is, even in the range in which the scattering cross section $\Phi$ oscillates, it is possible to obtain the value M by which the geometrical cross section $\pi a_p^2$ is to be multiplied, for each value of the particle diameter in a wide range of the relative refractive index n from 1 to about 2, based on FIGS. 3A, 3B, and 3C.

FIG. 4 shows relationships between the particle diameter Dp and the scattering cross section $\Phi$, where the relationships are obtained for several values of the relative refractive index based on the equations (7) and (9), and FIG. 5 shows relationships between the particle diameter Dp and the reciprocal of the particle density (multiplied by a certain value) in multiparticle systems, where the relationships are obtained by computer simulation based on Mie's scattering theory.

In the above computer simulation, it is assumed that light having a certain (finite) spread angle enters an optical medium having a cubic shape and containing particles, where the size of the cube is varied from 10 to 1,000 mm. That is, the relative dimensions of the incident light and the cube vary. In addition, the particle diameter Dp is varied over a wide range from the Rayleigh scattering range to the Fresnel diffraction range. Further, it is assumed that the light which enters the optical medium is output in the same direction as the incident light from a light-emission end located opposite to a light-entrance end, and the light-output efficiency at the light-emission end of the cube is 80%.

It is understood from FIGS. 4 and 5 that there is a close relationship between the scattering cross section and the number of the particles having a finite size and being contained in the optical medium.

<Lambert-Beer Law and Scattering Cross Section>

According to the Lambert-Beer law, the transmittance T in the case where a collimated light beam enters an isotropic medium is expressed as $$T = I/I_o = \exp(-\rho \cdot x), \quad (10)$$

where x is a distance, $I_o$ is the intensity of incident light, I is the intensity of emitted light, and $\rho$ is an attenuation constant.

It is possible to consider that the above attenuation constant $\rho$ is expressed as $$\rho = \Phi \cdot Np \cdot K_c, \quad (11)$$

where $\Phi$ is a scattering cross section of a particle, $N_p$ is the number of particles per unit volume in the medium (i.e., the particle density), and $K_c$ is a correction coefficient which is dimensionless, and is empirically obtained when light propagates in an optical medium having a finite volume.

The volume V of the optical medium, the number Npt of particles mixed into the optical medium, and the particle diameter Dp are parameters which are generally required for designing a light guide, where $N_p = N_{PT}/V$. Variations in the intensity of the emitted light are considered below.

$K_c$ is determined by comparison and analogy between FIGS. 4 and 5 based on several other data items (not shown). In this example, $K_c = 0.004$ is determined based on several other data items (not shown). The correspondence between the particle diameter and the scattering cross section $\Phi$ can be obtained from the equations (7) and (9), and therefore the light-output efficiency Eout can be expressed as $$E_{out} = \exp\{-(\Phi \cdot Np \cdot L_G \cdot K_c)\}, \quad (13)$$

where $L_G$ is the length of the optical medium in the light propagation direction. Thus, when $\Phi \cdot Np \cdot L_G = $ constant, the light-output efficiency Eout can be maintained constant. That is, when the number $N_p$ of particles per unit volume in an optical medium is changed according to the length of the optical medium in the light propagation direction, the light-output efficiency Eout can be maintained constant.

When the loss in the light guide including the Fresnel loss depending on the three-dimensional shape, the intensity distribution of the incident light, and the incident angle, and the internal transmittance, and the like is represented by a loss coefficient $K_L$, the equation (13) can be expressed as $$E_{out}=\exp\{-(\Phi \cdot Np \cdot L_G \cdot K_c)\} \cdot K_L. \tag{14}$$

That is, the light-output efficiency Eout can be determined by the scattering cross section $\Phi$, the particle density $N_p$, the length $L_G$ of the optical medium in the light propagation direction, the correction coefficient $K_c$, and the loss coefficient $K_L$. In other words, when the amount represented by the right side of the equation (14) is adjusted to equal a desired light-output efficiency, it is possible to obtain a light guide having the desired light-output efficiency.

<Fresnel Loss Factor>

First, the p-polarization component Rp and the s-polarization component Rs of the reflectance are expressed by the following equations (15a) and (15b), respectively.

$$Rp=\tan(\theta i-\theta r)/\tan(\theta i+\theta r), \text{ and} \tag{15a}$$

$$Rs=-\sin(\theta i-\theta r)/\sin(\theta i+\theta r), \tag{15b}$$

where $\theta i$ is an incident angle and $\theta r$ is a refraction angle. Therefore, based on the equations (15a) and (15b), the intensity Ir of the reflected light becomes $$Ir=(Rp^2+Rs^2)/2. \tag{16}$$

Thus, the intensity It of the transmitted light can be obtained as $$It=1-Ir. \tag{17}$$

When the angular distribution of the incident light is taken into consideration, the intensity It' of the transmitted light dependent on the angular distribution of the incident light can be expressed as $$It'(\theta i)=It(\theta i) \cdot D(\theta i), \tag{18}$$

where $D(\theta i)$ is an intensity distribution function.

<Calculation of Fresnel Loss>

When a light beam having an arbitrary spread angle enters the optical medium, the Fresnel loss varies with the incident angle $\theta i$, which is arbitrary. The Fresnel loss at the boundary surface can be expressed as $$\int_0^{\theta \max} It(\theta i) \cdot D(\theta i) d\theta i \Big/ \int_0^{\theta \max} D(\theta i) d\theta i, \tag{19}$$

where $\theta \max$ is the maximum incident angle of the light beam. When it is assumed that the intensity distribution of the incident light has a rectangular shape for simplification of the calculation, the equation (19) becomes $$\int_0^{\theta \max} It(\theta i) d\theta i \Big/ \int_0^{\theta \max} d\theta i, . \tag{20}$$

FIG. 6 shows Fresnel losses at interfaces between mediums having various values of the refractive index, which are obtained based on the equation (20). In FIG. 6, the ordinate corresponds to the transmittance, in which the Fresnel losses are reflected. For example, when the Fresnel loss is zero, the transmittance becomes one.

<Calculation of Light-output Efficiency Affected by Fresnel Loss>

It is understood from FIG. 6 that the Fresnel loss does not vary so greatly even when the refractive index of the optical medium is greatly different from the refractive index of the ambient medium. In the case where the optical medium has a shape of a rectangular parallelopiped (including a cube) or a cylinder, it is considered that the cosine component of light is conserved in reflection and refraction of the light, and the emission angle becomes equal to the entrance angle when particles are not mixed into the optical medium. In addition, when the internal transmittance $T_{in}$ can be approximated to be one (i.e., $T_{in} \approx 1$), the product of the transmittances at the light-entrance end face and the light-emission end face becomes the total transmittance $T_{total}$. For example, when the refractive index of the optical medium is 1.5 (i.e., n=1.5), $T_{total}=0.92$.

Thus, the equation (14) becomes $$E_{out}=\exp\{-(\Phi \cdot Np \cdot L_G \cdot K_c)\} \cdot 0.92. \tag{14b}$$

FIGS. 7A through 7E show relationships between the particle diameter and the light-output efficiency obtained based on the equation (14b). When the angular distribution of the incident light is not flat, or the incident angle of the incident light is 30 degrees or greater, the light-output efficiency can be obtained based on the equation (14) and the Fresnel loss obtained by the equation (19) or (20). However, it is preferable to limit the half-angle divergence of the incident light to about 30 degrees in consideration of the critical angle at the light-emission end face.

In order to obtain the results of FIGS. 7A through 7E, first, target average values of the light-output efficiency are determined to be 80%, 70%, 60%, 50%, and 40%. Then, values of the light-output efficiency are calculated as described above according to the present invention for the respective target average values of the light-output efficiency, several particle diameters, and three values of the length $L_G$ of the optical medium in the light propagation direction. The scattering cross section $\Phi$ is obtained based on the Rayleigh's theory for the particle diameter of 20 nm, and based on Mie's theory for the particle diameters of 200 nm or greater, and it is assumed that $K_L=0.92$, which is an empirically obtained value. In addition, results of fine-grained simulations are obtained for each target average value of the light-output efficiency and the same particle diameters, particle densities, and values of the length $L_G$ of the optical medium in the light propagation direction as those used in the calculation according to the present invention.

In FIGS. 7A through 7E, the calculated values of the light-output efficiency are indicated in graphs by filled marks (a rectangle, a triangle, and a circle which are filled), and the values of the light-output efficiency obtained by the simulations are indicated in the graphs by blank marks (a triangle, a rectangle, and a circle which are blank). In addition, the values of the length $L_G$ of the optical medium in the light propagation direction corresponding to the respective marks are indicated under the graphs as "10 mm C," "100 mm C," "1,000 mm C," "S 10 mm," "S 100 mm," and "S 1,000 mm," where C and S indicate calculation and simulation, respectively.

According to the results indicated in FIGS. 7A through 7E, when the target average values of the light-output efficiency is 60% or greater, the values of the light-output efficiency calculated according to the present invention are within 10% of the corresponding results of the fine-grained simulations, i.e., the values of the light-output efficiency calculated according to the present invention well coincide with the corresponding results of the fine-grained simulations. In other words, when the value of $\Phi \cdot Np \cdot L_G \cdot K_c$ is 0.4 or smaller, the values of the light-output efficiency calculated according to the present invention are within 10% of the corresponding results of the fine-grained simulations. In addition, FIGS. 7A through 7E show that even when the value of $\Phi \cdot Np \cdot L_G \cdot K_c$ is 0.9 or smaller, the values of the light-output efficiency calculated according to the present invention are within 50% of the corresponding results of the fine-grained simulations. In the case where simulation is performed or prototypes are produced, it is considered that a difference of about 50% between a value of the light-output efficiency calculated according to the present invention and a result of a corresponding fine-grained simulation does not cause a problem in aiming at a target value of the light-output efficiency. Further, when the difference is less than 10%, it is unnecessary to perform simulation, or estimate and narrow down samples. Therefore, the development efficiency increases.

Based on the above results of calculations and simulations, it is considered that a prospective solution for the light-output efficiency can be obtained by using the equation (14) and the data in the Rayleigh scattering range and the range in which the scattering cross section according to Mie's theory converges. The present invention is made based on the above consideration, and realizes a desired light-output efficiency by designing a light guide so as to satisfy the equation, $$E_{out} = \exp\{-(\Phi \cdot Np \cdot L_G \cdot K_c)\} \cdot K_L.$$

<Example of Calculation>

Tables 1 through 9 and FIGS. 16A through 16I show calculation results of light guides having other shapes including a sheetlike rectangular parallelepiped, a cylinder, and a rectangular parallelepiped. FIGS. 16A through 16I show the values indicated in Tables 1 through 9 in graphs, respectively. In the calculations of Tables 1 through 9 and FIGS. 16A through 16I, the values of $\Phi \cdot Np \cdot L_G \cdot K_c$ are 0.9 or less, and the value of $K_L$ is 0.92.

In FIGS. 16A through 16I, the calculated values of the light-output efficiency and the values of the light-output efficiency obtained by the simulations are indicated in the graphs by filled and blank marks (triangles, rectangles, and circles which are filled or blank). In addition, the dimensions of the optical mediums corresponding to the respective marks are indicated in millimeters under the graphs, where (c) and (s) indicate calculation and simulation, respectively.

Further, in each of FIGS. 16A through 16I, an average value of light-output efficiencies obtained for the respective particle diameters is indicated as the "average light-output efficiency" instead of the target light-output efficiency. As can be understood from Tables 1 through 9 and FIGS. 16A through 16I, the calculation results according to the present invention well coincide with the corresponding results of the simulations. In particular, the results for the particle diameter of 2,000 nm exhibit remarkable coincidence between the calculation results according to the present invention and the results of the simulations.

<Intensity Distribution of Emitted Light>

Since the intensity distribution of emitted light is influenced by an intensity distribution and a spread angle of each light source, the number and arrangement of the light sources, and the like, the intensity distribution characteristics of the emitted light are estimated by simulation. FIGS. 8A through 8C, 9A, 9B, and 10 show intensity distribution characteristics of the emitted light which are obtained by simulation for respective particle diameters. In the simulation, it is assumed that a light source is located at the center of a surface on the light-entrance side, and has a half-angle divergence of 30 degrees. FIGS. 8A through 8C respectively show results of simulations performed under the same conditions as Table 1 for small-, medium-, and large-size light guide sheets each having a shape of a thin rectangular parallelepiped. FIGS. 9A and 9B respectively show results of simulations performed under the same conditions as Table 4 for small- and large-size light guides each having a shape of a cylinder. FIG. 10 shows a result of a simulation performed under the same conditions as Table 7 for a light guide having a shape of a rectangular parallelepiped.

It is understood from FIGS. 8A through 8C, 9A, 9B, and 10 that almost uniform intensity distributions are realized by light guides which have an optical medium with a rectangular cross section and a light-output efficiency of about 90%. However, in each light guide having a cylindrical shape, the width in which the intensity of emitted light is high is reduced in the case where the diameter of the particles contained in the optical medium is smaller than 200 nm, although the maximum light-output efficiency is not changed. Therefore, it is understood that the diameter smaller than 200 nm should not be used when a uniform intensity distribution is required. As is evident from the above consideration and computer simulations, in order to produce a light guide by mixing light-scattering particles into an arbitrary optical medium, it is possible to narrow down values of the light-output efficiency based on the equation (14), a scattering cross section corresponding to a diameter of each particle, a particle density, dimensions of the optical medium, and the like. Thereafter, it is possible to obtain further intensity distribution characteristics of emitted light by fine-grained simulation. Alternatively, it is possible to produce several different samples in accordance with a condition which is narrowed in advance based on the equation (14), and empirically evaluate the samples.

BRIEF DESCRIPTION OF THE DRAWINGS

FIGS. 3A, 3B, and 3C are graphs indicating oscillations of the scattering cross sections in the cases where the relative refractive indexes are 1.1, 1.5, and 2.1, respectively.

FIGS. 7A through 7E are graphs indicating relationships between the particle diameter and the light-output efficiency, obtained for comparison by the present invention and computer simulation based on the target light-output efficiencies of 80%, 70%, 60%, 50%, and 40%, respectively.

FIGS. 8A through 8C are graphs respectively indicating intensity distribution characteristics of light emitted from small-, medium-, and large-size light guide sheets each having a shape of a thin rectangular parallelopiped.

FIGS. 9A and 9B are graphs respectively indicating intensity distribution characteristics of light emitted from small- and large-size light guides each having a shape of a cylinder.

FIG. 10 is a graph indicating intensity distribution characteristics of light emitted from a light guide having a shape of a rectangular parallelopiped.

FIG. 11 is a diagrammatic plan view of a sheetlike light guide according to a first embodiment of the present invention.

FIGS. 16A through 16C are graphs indicating relationships between the particle diameter and the light-output efficiency in sheetlike light guides, where the relationships are obtained by the present invention and computer simulation for comparison based on the target light-output efficiencies of 80%, 70%, and 60%.

FIGS. 16D through 16F are graphs indicating relationships between the particle diameter and the light-output efficiency in light guides having a shape of a cylinder, where the relationships are obtained by the present invention and computer simulation for comparison based on the target light-output efficiencies of 80%, 70%, and 60%.

FIGS. 16G through 16I are graphs indicating relationships between the particle diameter and the light-output efficiency in light guides having a shape of a rectangular parallelopiped, where the relationships are obtained by the present invention and computer simulation for comparison based on the target light-output efficiencies of 80%, 70%, and 60%.

DESCRIPTION OF PREFERRED EMBODIMENTS

Embodiments of the present invention are explained in detail below with reference to the attached drawings.

First Embodiment

The first embodiment of the present invention is explained below.

The sheetlike light guide for use as a bus in optical communications is known. In order to perform bidirectional communication, the sheetlike light guide is required to be transparent. FIG. 11 is a diagrammatic plan view of a sheetlike light guide according to the first embodiment of the present invention. The sheetlike light guide 10 according to the first embodiment is a transparent, sheetlike light guide. A plurality of optical fibers 21, 22, and 23 are connected to a first end face of the sheetlike light guide 10, and a plurality of optical fibers 31, 32, and 33 are connected to a second end face of the sheetlike light guide 10. At this time, it is necessary that light is efficiently and equally delivered to the respective optical fibers. In addition, it is preferable that the light-output efficiency Eout, which is reduced by the loss in the sheetlike light guide perse and the loss in the coupling to the optical fibers, is 0.9 or greater, and the maximum intensity Imax and the minimum intensity Imin of light emitted from the sheetlike light guide satisfy the relationship, $$(Imax-Imin)/(Imax+Imin) \times 100 < 10 (\%).$$

In order to realize the above requirement, Eout≧0.9, the design condition is obtained by using the equation (14b). In this example, the target light-output efficiency Eout is determined to be 0.9, and it is assumed that the diameter of each particle is 7 micrometers. Thus, the following values can be determined.

The scattering cross section $\Phi$ is $7.7 \times 10^{-6}$ (mm$^2$), the sheet bus length $L_G$ is 20 (mm), and the particle density $N_p$ is $1.4 \times 10^4$/mm$^3$.

Figure 1:
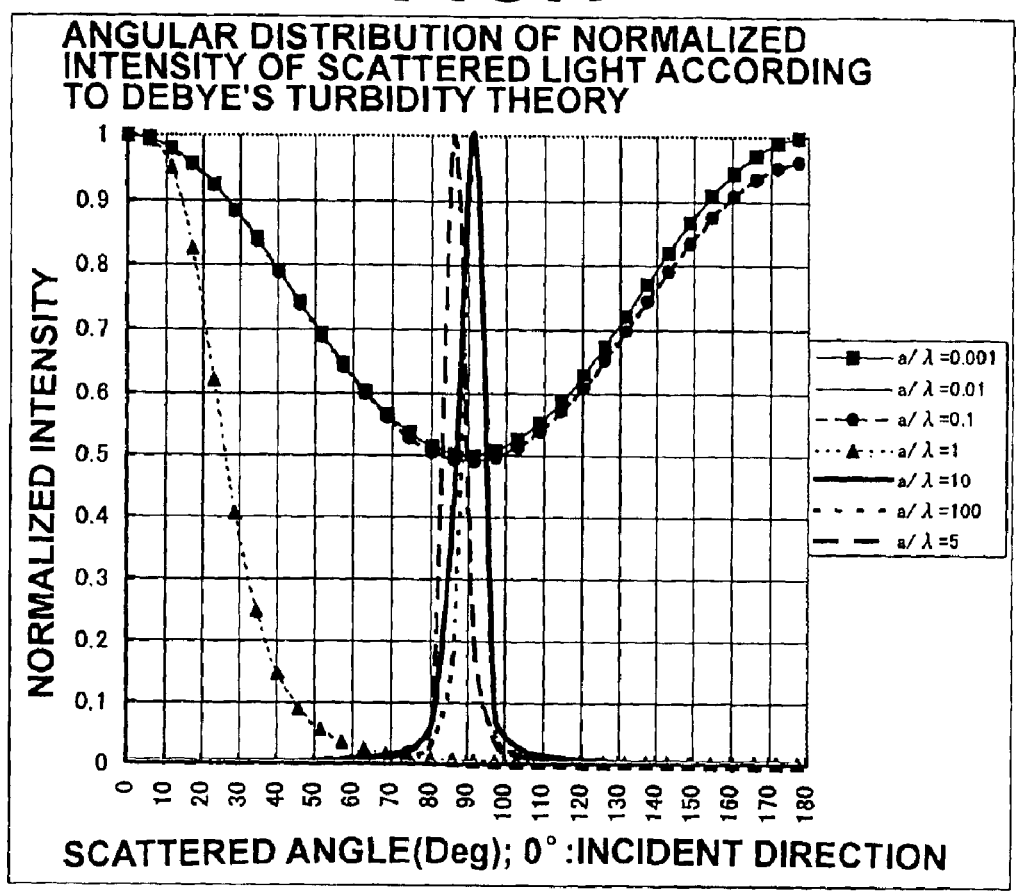
FIG. 1 is a graph indicating normalized angular distributions of scattered light according to the Debye's turbidity theory.
Figure 2:
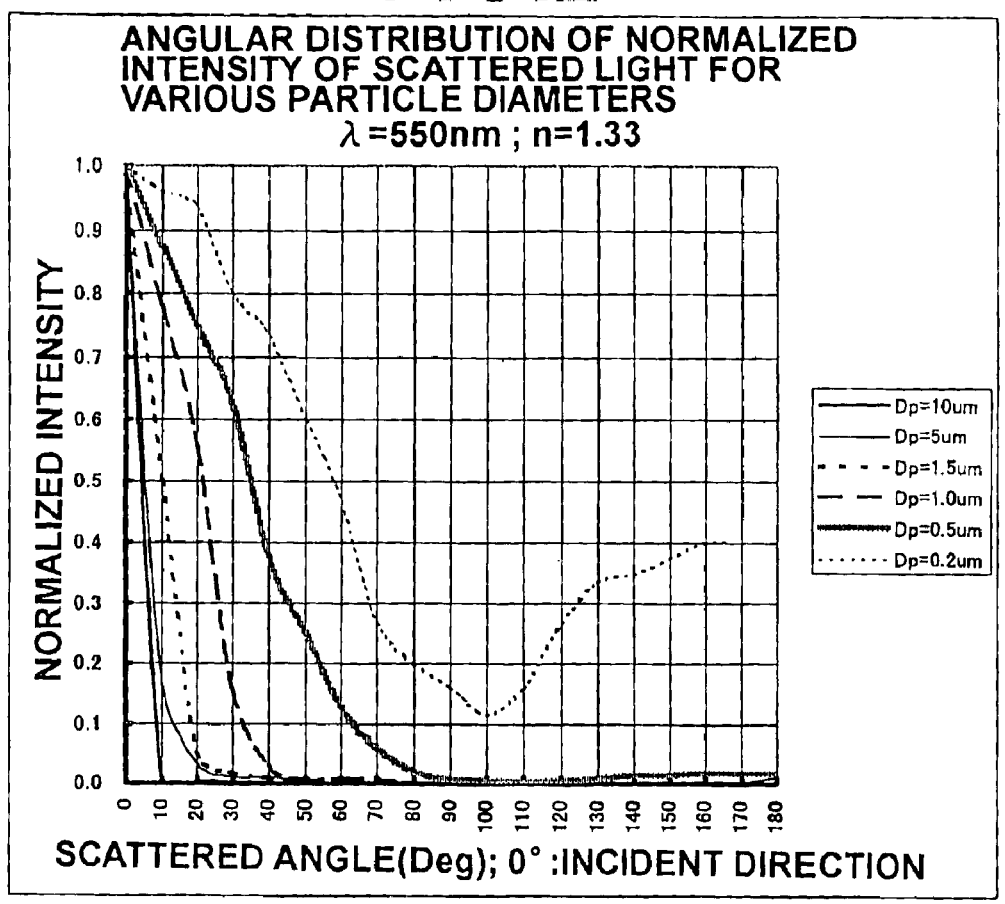
FIG. 2 is a graph indicating normalized angular distributions of scattered light according to Mie's scattering theory.
Figure 3A:
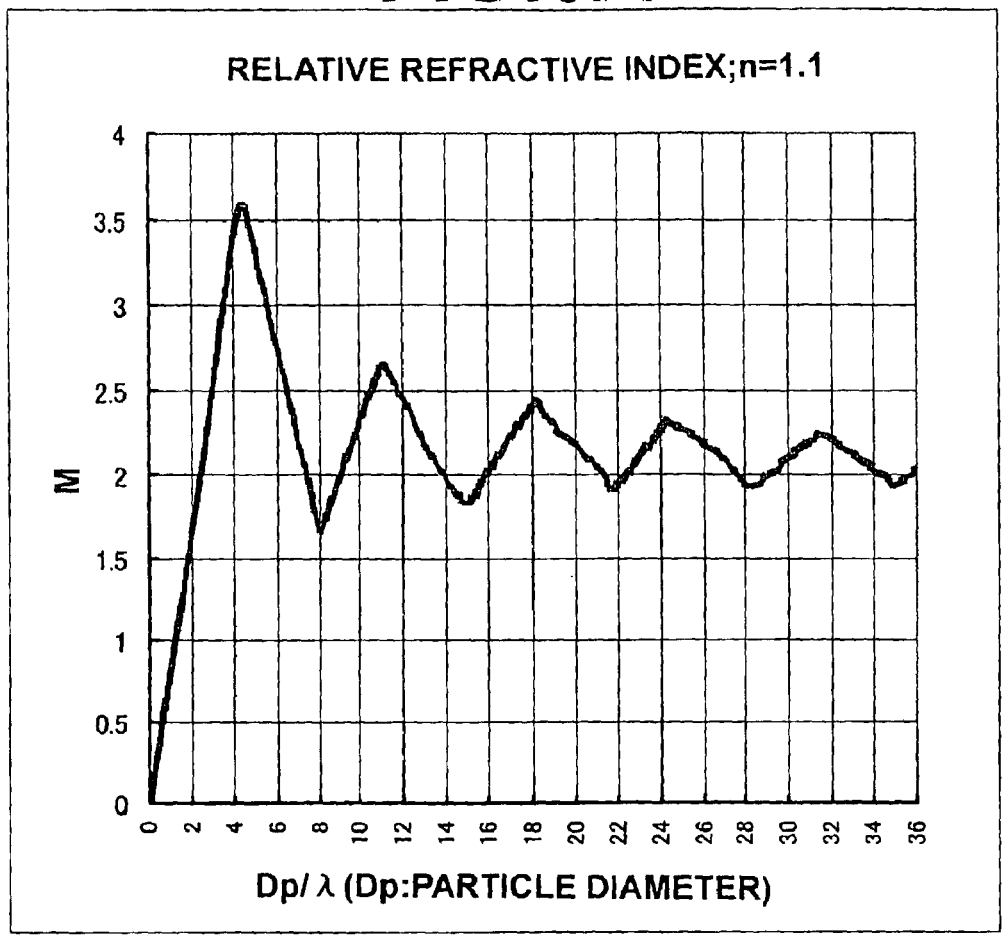
Figure 3C:
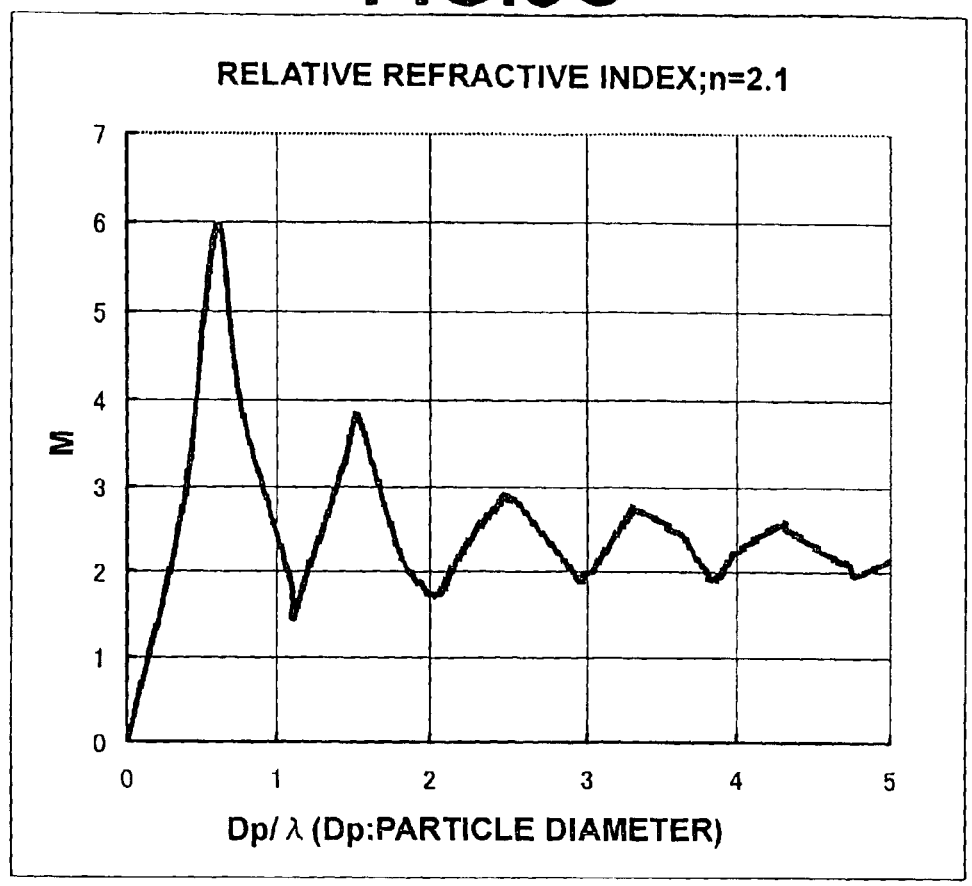
Figure 4:
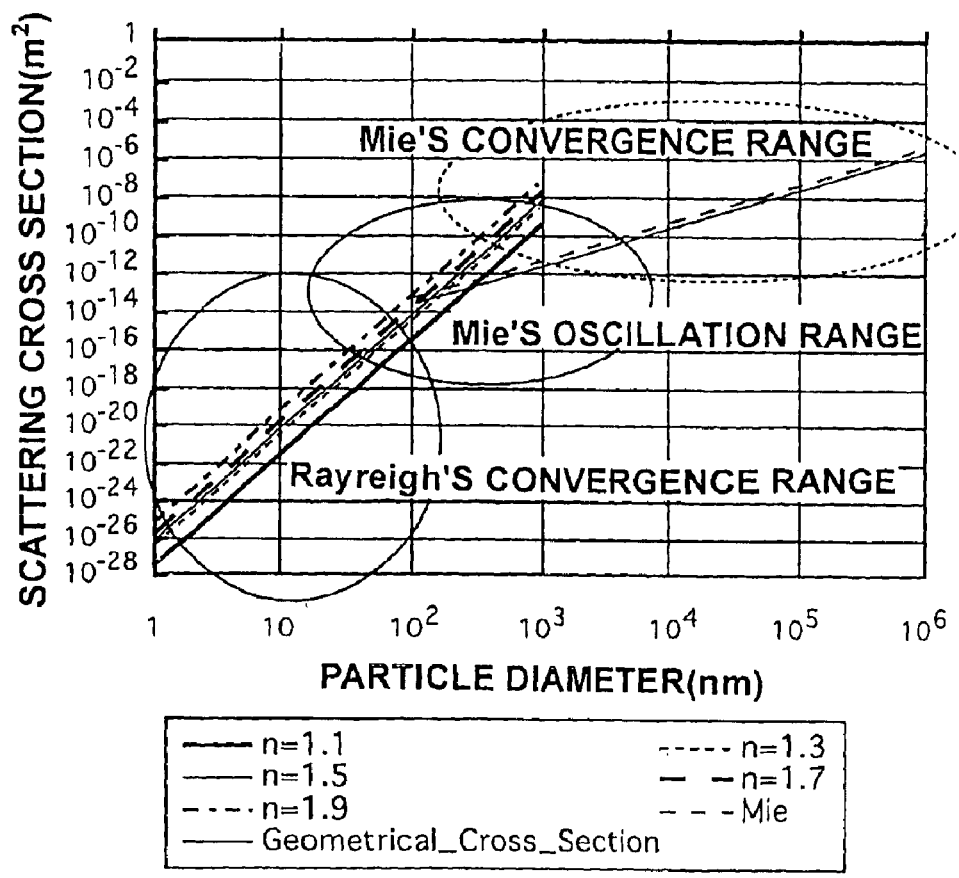
FIG. 4 is a graph indicating relationships between the particle diameter and the scattering cross section, where the relationships are obtained by computer simulation for several values of the relative refractive index.
Figure 5:
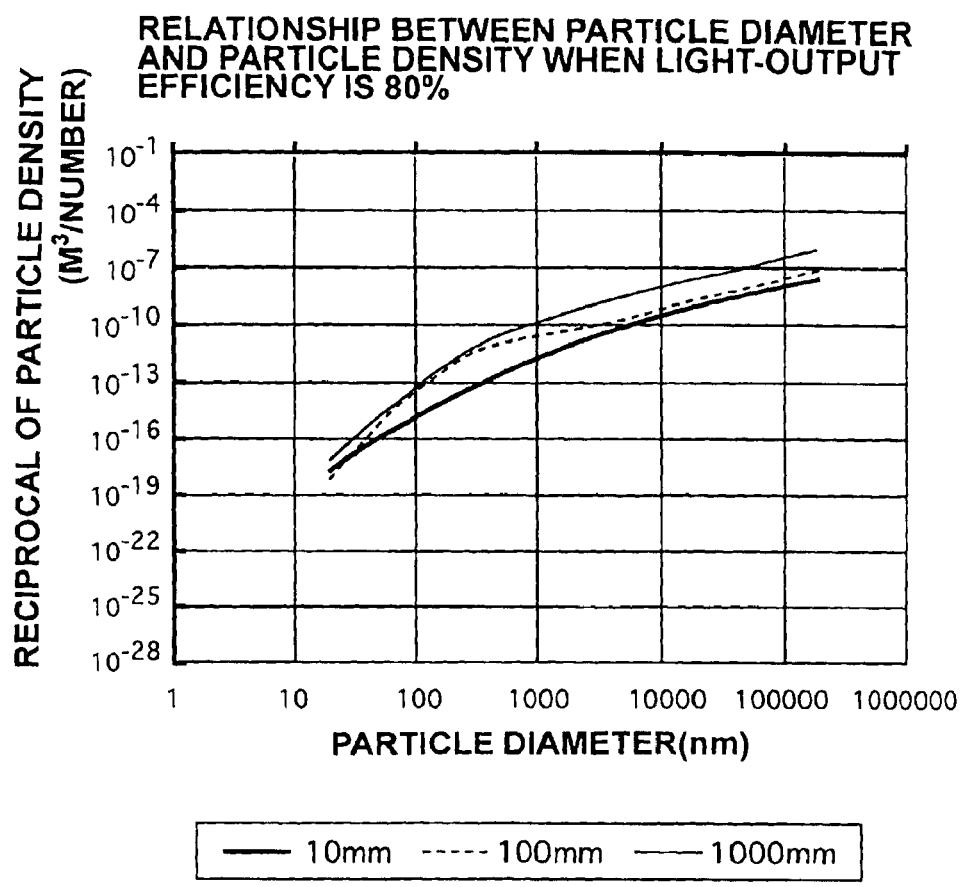
FIG. 5 is a graph indicating relationships between the particle diameter and the reciprocal of the particle density in multiparticle systems, where the relationships are obtained by computer simulation based on Mie's scattering theory.
Figure 6:
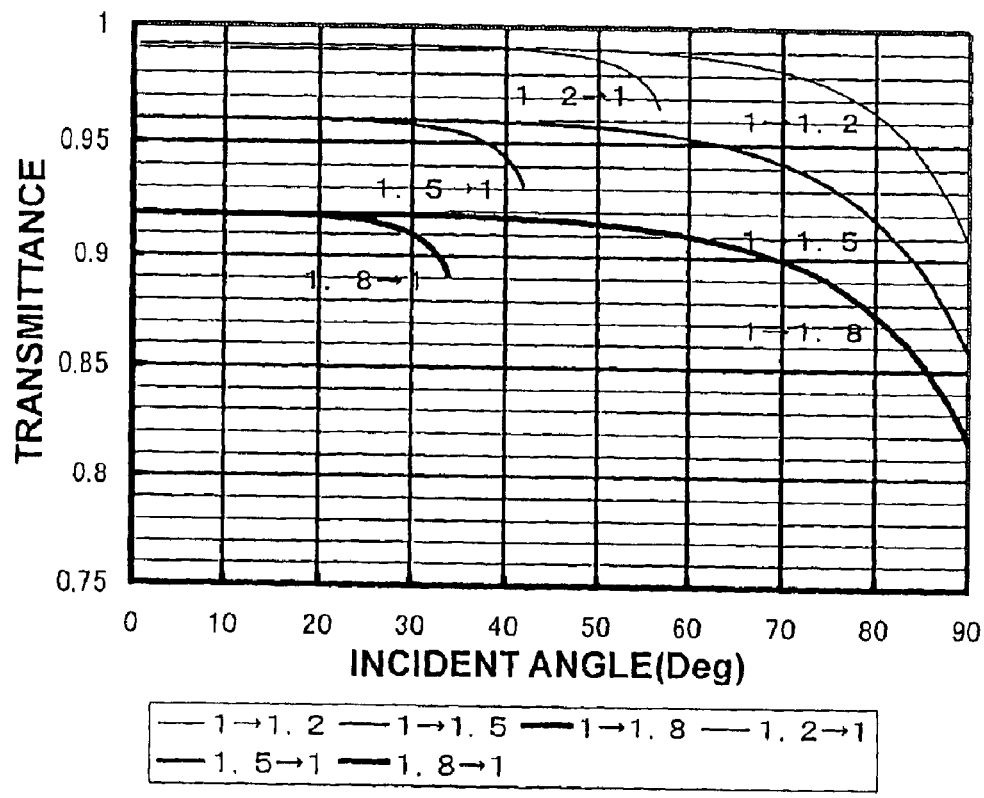
FIG. 6 is a graph indicating Fresnel losses at interfaces between mediums having various values of the refractive index.
Figure 7E:
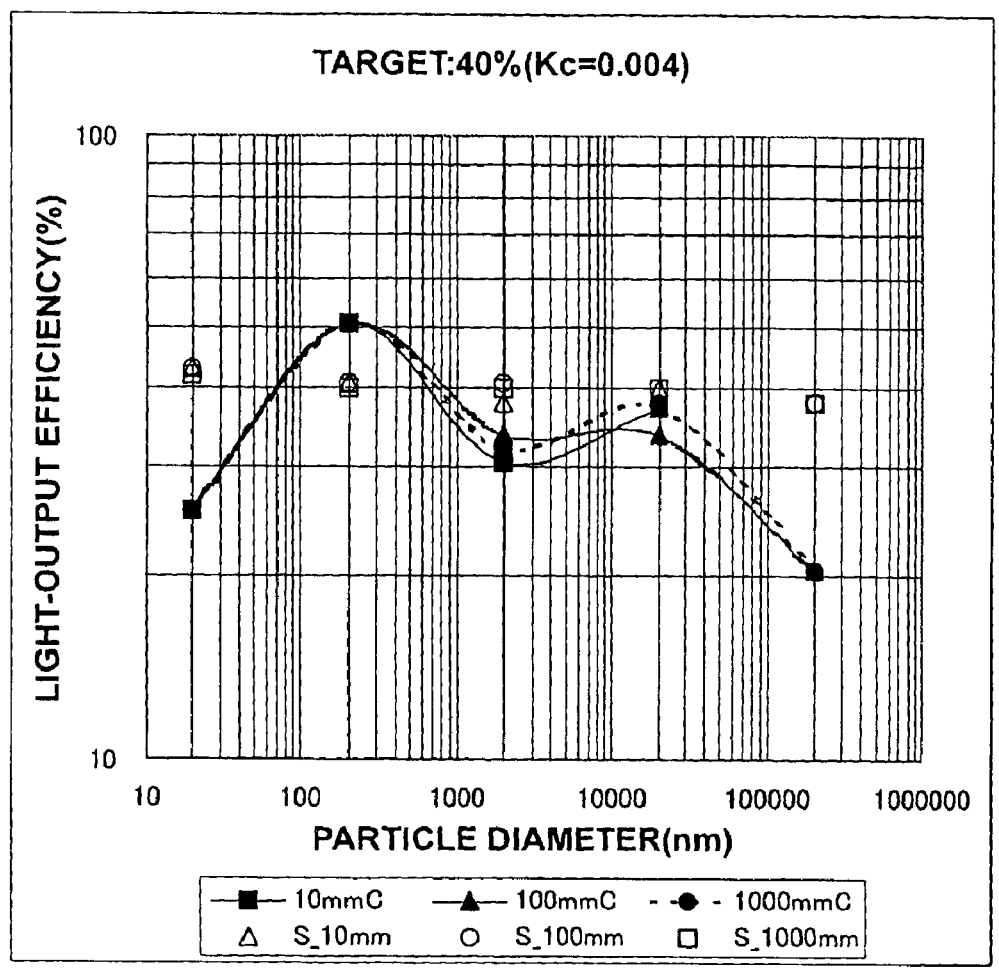
Figure 8A:
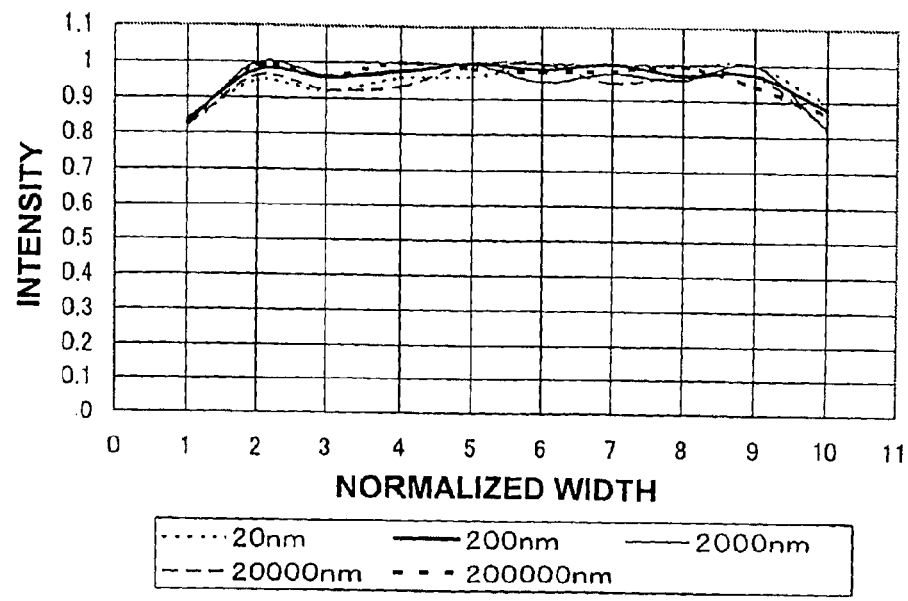
Figure 8B:
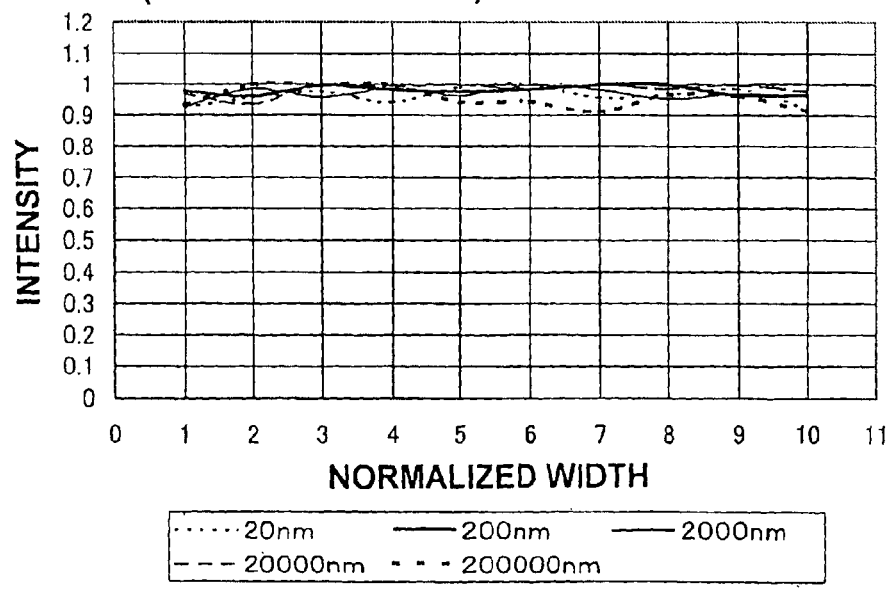
Figure 9B:
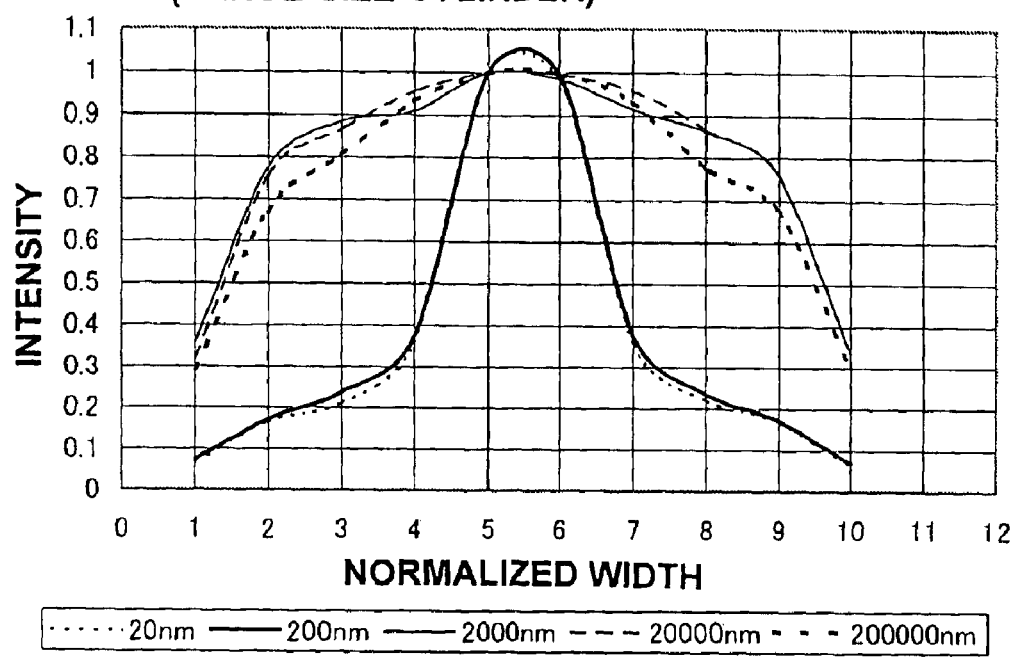
Figure 12:
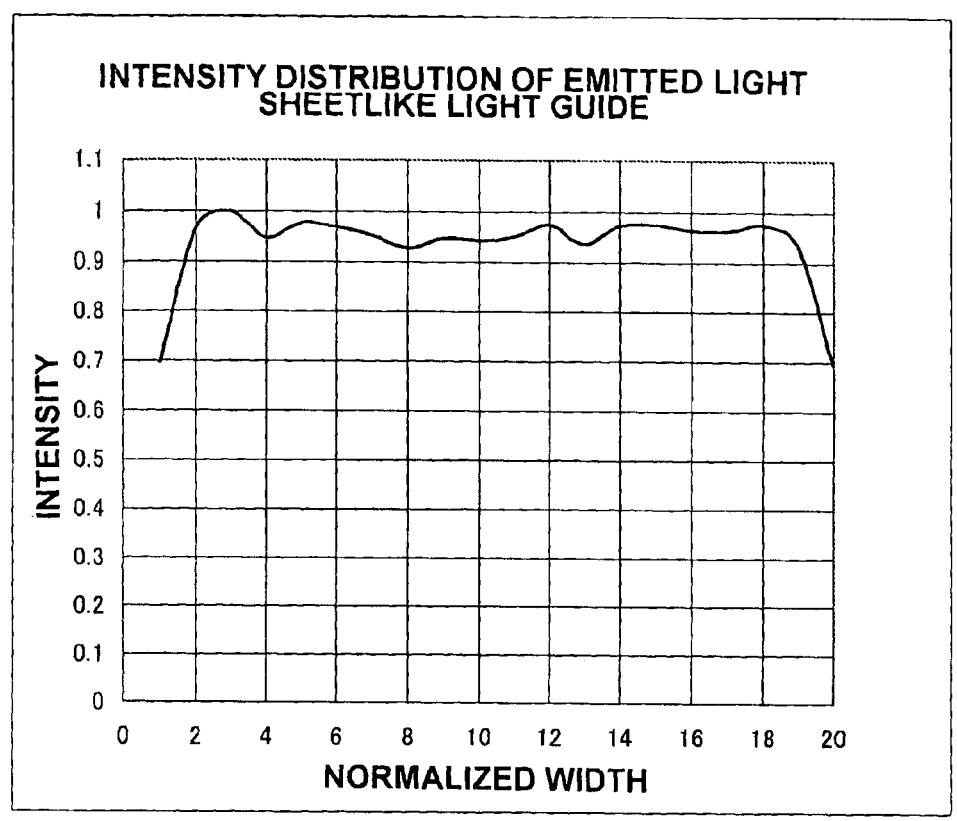
FIG. 12 is a graph indicating an intensity distribution of light emitted from the sheetlike light guide of FIG. 11.

At this time, the value of $\Phi \cdot Np \cdot L_G \cdot K_c$ is 0.022, and the value of $K_L$ is 0.92. FIG. 12 shows an intensity distribution of light emitted from the sheetlike light guide formed based on the above values. In addition, a light-output efficiency Eout (SIM) obtained by a simulation using the above values is 0.91.

Second Embodiment

Next, the second embodiment of the present invention is explained below.

Figure 13:
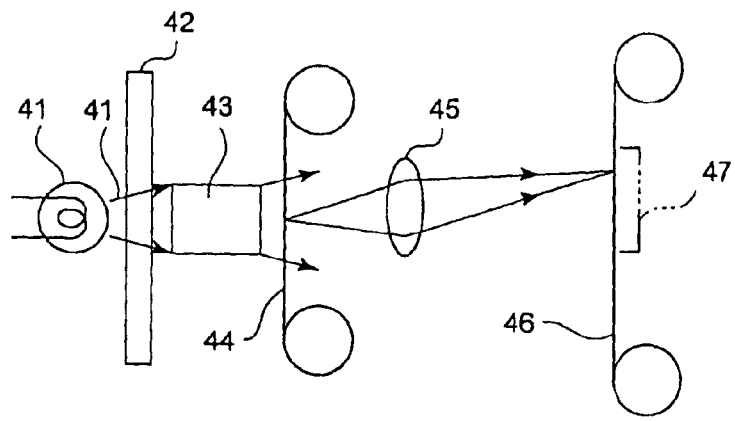
FIG. 13 is a graph indicating a system for illuminating a negative, where a light guide according to a second embodiment of the present invention can be used in the system.

The mirror box, which realizes a diffused lighting system, is known as an element for illuminating a negative in the field of photography. FIG. 13 shows a system for illuminating a negative by using a mirror box. In the system of FIG. 13, illumination light 41 emitted from a light source 40 enters a mirror box 43 through a light control filter 42, and is diffused in the mirror box 43 so that the intensity of the illumination light 41 becomes uniform. Then, the illumination light 41 diffused in the mirror box 43 is applied to a negative film 44, so that an image of the illuminated negative film 44 is focused on a sheet of photographic paper 46 such as color paper through an image-formation lens 45. Alternatively, in the so-called digital laboratories and the like, the sheet of photographic paper 46 is replaced with an image-forming element 47 (such as a CCD element) which reads the image of the illuminated negative film 44, and the image read by the illuminated negative film 44 is written on a sheet of photographic paper in an image recording system (not shown).

The dimensions of the light-emission end face of the mirror box 43 is considerably greater than the dimensions of each frame of the negative film 44. For example, the size of the mirror box 43 corresponding to the 135-size negative film is 60 mm square. In addition, the length of the mirror box 43 in the light propagation direction is about 100 mm. Further, in the digital mini-laboratory systems, a tapered-type mirror box is used in the case of line illumination in order to increase the optical power density at the light-emission end, and a mirror box having the same shape as that in the analog mini-laboratories is used in the case of area illumination. The light source 40 can be realized by a halogen lamp or an LED.

An important requirement imposed on the mirror box 43 is to emit light which has a flat intensity distribution at the image portion of the negative film 44. In particular, since a CCD is used as the image-forming element 47 in the digital mini-laboratory systems, the digital mini-laboratory systems do not require so flat intensity distribution as that required in the analog mini-laboratory systems. However, in consideration of the number of saturated electrons in the CCD and shading of the image-formation lens 45, it is preferable that the flatness of the intensity distribution of light emitted from the mirror box 43 is less than 10%.

The light guide according to the second embodiment can be used in place of the mirror box 43 in the case of area illumination. Since the light emitted from the light guide is applied to the negative, particles having a diameter which makes the wavelength dependence of the scattering cross section in the visible wavelength range small are used in the second embodiment. In this example, the particle diameter is determined to be 10 micrometers.

When the target light-output efficiency Eout is determined to be 0.9, the following design conditions can be determined by using the equation (14b).

The dimensions ($W \times T \times L_G$) of the light guide are $60 \times 60 \times 100$ (mm), the scattering cross section $\Phi$ is $1.57 \times 10^{-4}$ (mm$^2$), the length $L_G$ of the light guide is 100 (mm), and the particle density $N_p$ is $1.4 \times 10^4$/mm$^3$.

Figure 14A:
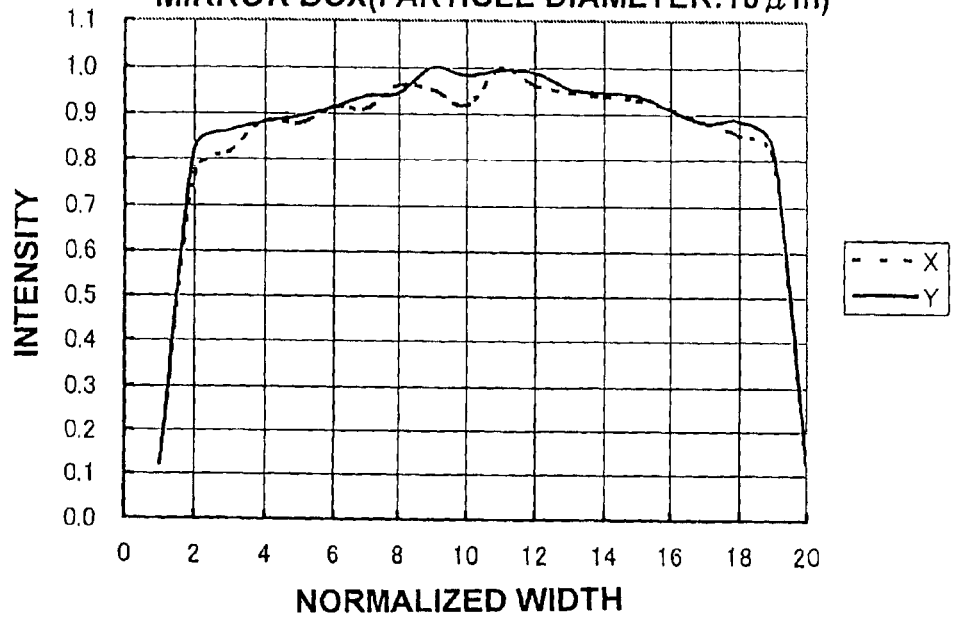
FIG. 14A is a graph indicating an intensity distribution of light emitted from a central portion of the light guide according to the second embodiment.
Figure 14B:
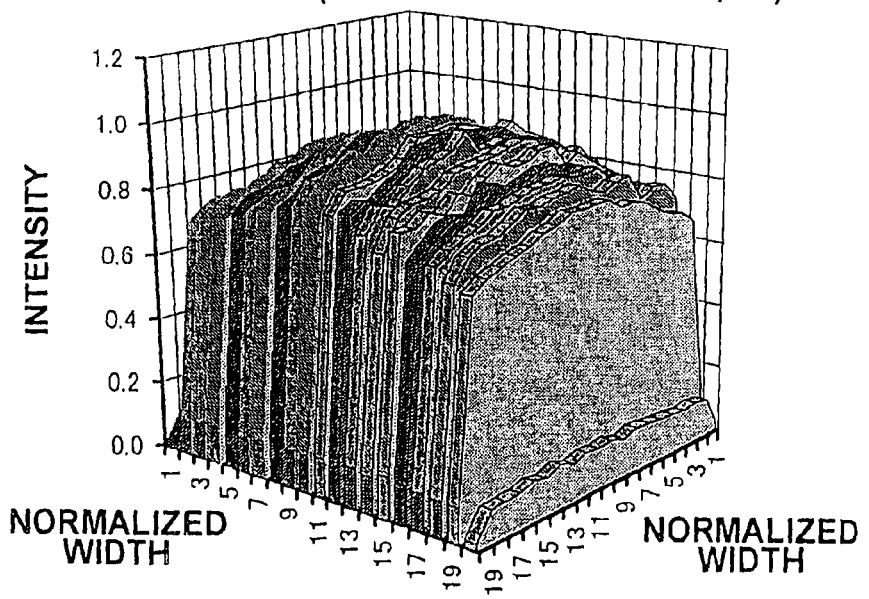
FIG. 14B is a graph indicating a two-dimensional distribution of the intensity of light emitted from a central portion of the light guide according to the second embodiment.

FIG. 14A shows an intensity distribution of light emitted from a central portion of the light guide, and FIG. 14B shows a two-dimensional distribution of the intensity of light emitted from a central portion of the light guide. In this case, a light-output efficiency Eout (SIM) obtained by a simulation using the above design conditions is 0.9.

Further, when the target light-output efficiency Eout is determined to be 0.8, the particle density $N_p$ can be determined to be $2.2 \times 10^3$/mm$^3$. In this case, a light-output efficiency Eout (SIM) obtained by a simulation is 0.74, i.e., satisfactorily coincides with the target light-output efficiency Eout. In addition, the intensity distribution of light emitted from the light guide exhibits a flatness smaller than 10% in a 36 mm square area corresponding to about 60% of the total cross-sectional area of the light guide.

Third Embodiment

Next, the third embodiment of the present invention is explained below.

The light guide according to the third embodiment can be used in place of the mirror box 43 in the case of line illumination. For a similar reason to the second embodiment, the particle diameter is determined to be 10 micrometers.

When the target light-output efficiency Eout is determined to be 0.9, the following design conditions can be determined by using the equation (14b).

The dimensions ($W \times T \times L_G$) of the light guide are $30 \times 2 \times 60$ (mm), the scattering cross section $\Phi$ is $1.57 \times 10^{-4}$ (mm$^2$)

the length $L_G$ of the light guide is 60 (mm), and the particle density $N_p$ is $8.0 \times 10^2$/mm$^3$.

Figure 15:
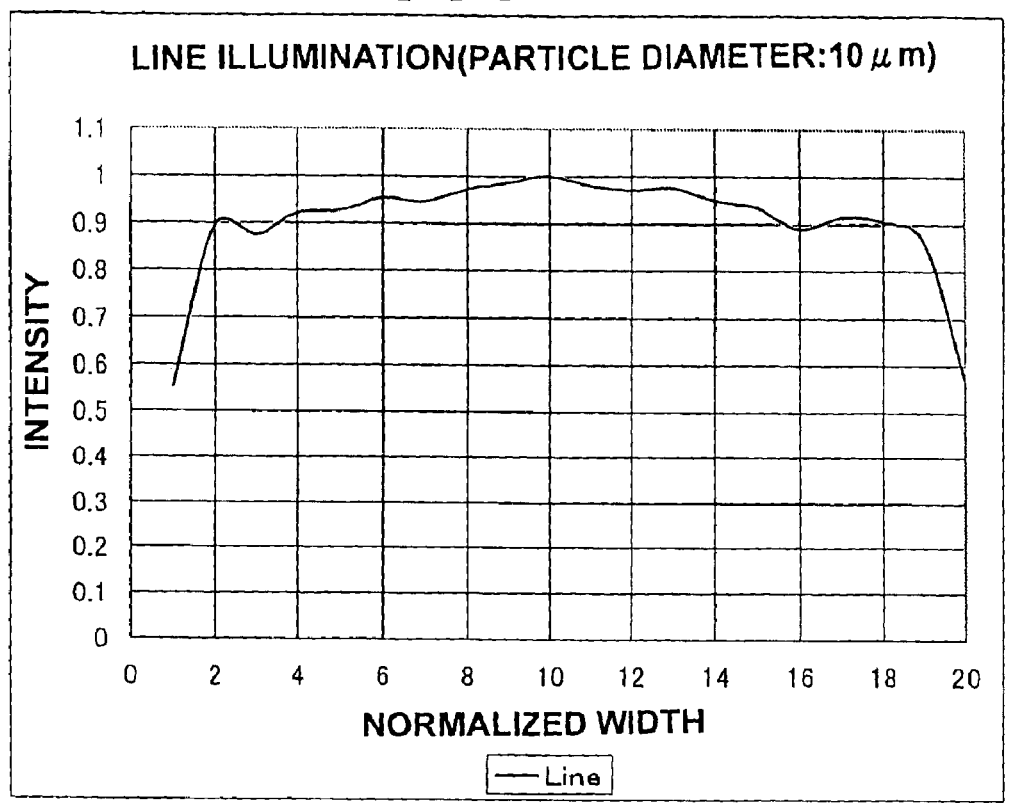
FIG. 15 is a graph indicating an intensity distribution of light emitted from a central portion of a light guide according to a third embodiment of the present invention.
Figure 16E:
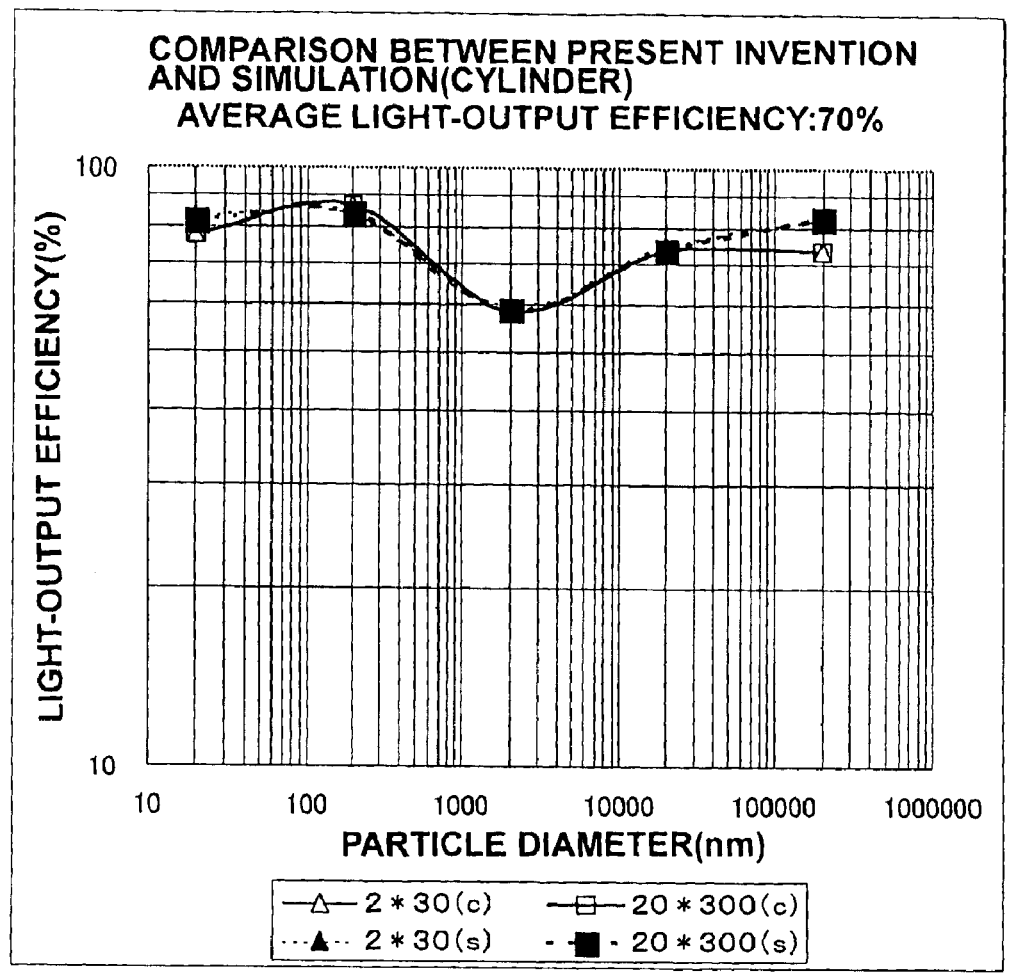

FIG. 15 shows an intensity distribution of light emitted from a central portion of the light guide. In this case, a light-output efficiency Eout (SIM) obtained by a simulation using the above design conditions is 0.91.

Further, when the target light-output efficiency Eout is determined to be 0.8, the particle density Np can be determined to be $3.6 \times 10^3$/mm$^3$. In this case, a light-output efficiency Eout (SIM) obtained by a simulation is 0.8, which is completely identical to the target light-output efficiency Eout. In addition, the intensity distribution of light emitted from the light guide exhibits a flatness smaller than 10% in an area corresponding to 80% of the total cross-sectional area of the light guide.

Since the dimensions ($W \times T \times L$) of the conventional tapered-type mirror boxes are as large as about $50 \times 30 \times 100$ (mm). Therefore, when the tapered-type mirror boxes are replaced with the light guide according to the third embodiment, optical systems using the tapered-type mirror boxes can be downsized.

Variations (i) The illumination system in which the light guides according to the second and third embodiments can be used has only one light source, and the half-angle divergence of the emitted light is 30 degrees. However, when a uniform intensity distribution is required, the required uniformity can be achieved by using a plurality of light sources.

(ii) Although the optical axis of the optical medium in each of the above embodiments is straight, it is also possible to calculate and evaluate design parameters by using the equations (14) and (19) even in the case where the optical axis of the optical medium is bent or a plurality of optical mediums are combined.

(iii) No parameter which limits the shape of the cross section of the light guide appears in the equation (14). In other words, the equation (14) can be used for evaluating light guides having any cross-sectional shapes. In addition, it is also possible to obtain the scattering cross section $\Phi$ in the equation (14) for nonspherical particles as well as the spherical particles.

(iv) When an average scattering cross section per unit particle density is obtained in advance by calculation or actual measurement, it is possible to immediately obtain the light-output efficiency from the equation (14). It is also possible to obtain the average scattering cross section per unit particle density in the case where particles having various diameters are contained in the optical medium. In this case, the manufacturing condition can be narrowed even when simulation cannot be performed. The development efficiency is increased by producing and evaluating prototype samples corresponding to a manufacturing condition which is a little broader than the narrowed manufacturing condition.

(v) In addition, all of the contents of the Japanese patent application No.2002-261933 are incorporated into this specification by reference.

TABLE 1

Comparison with Simulation for Sheetlike Rectangular Parallelopiped Light Guide (Eout = 0.8)

| (1) | (2) | (3) | (4) | (5) | (6) |
|---|---|---|---|---|---|
| $2 \times 10^1$ | $1.1 \times 10^{-22}$ | $1.0 \times 10^{13}$ | $4 \times 1 \times 20$ | 84 | 87 |
| $2 \times 10^1$ | $1.1 \times 10^{-22}$ | $2.5 \times 10^{12}$ | $16 \times 1 \times 80$ | 84 | 88 |
| $2 \times 10^1$ | $1.1 \times 10^{-22}$ | $6.3 \times 10^{11}$ | $64 \times 1 \times 320$ | 84 | 88 |
| $2 \times 10^2$ | $1.5 \times 10^{-14}$ | $3.0 \times 10^{7}$ | $4 \times 1 \times 20$ | 89 | 89 |
| $2 \times 10^2$ | $1.5 \times 10^{-14}$ | $7.5 \times 10^{6}$ | $16 \times 1 \times 80$ | 89 | 89 |
| $2 \times 10^2$ | $1.5 \times 10^{-14}$ | $1.9 \times 10^{8}$ | $64 \times 1 \times 320$ | 89 | 89 |
| $2 \times 10^3$ | $12.6 \times 10^{-12}$ | $3.0 \times 10^{5}$ | $4 \times 1 \times 20$ | 68 | 75 |
| $2 \times 10^3$ | $12.6 \times 10^{-12}$ | $7.5 \times 10^{4}$ | $16 \times 1 \times 80$ | 68 | 75 |
| $2 \times 10^3$ | $12.6 \times 10^{-12}$ | $1.9 \times 10^{4}$ | $64 \times 1 \times 320$ | 68 | 76 |
| $2 \times 10^4$ | $6.3 \times 10^{-10}$ | $3.0 \times 10^{3}$ | $4 \times 1 \times 20$ | 79 | 86 |
| $2 \times 10^4$ | $6.3 \times 10^{-10}$ | $7.5 \times 10^{2}$ | $16 \times 1 \times 80$ | 79 | 86 |

TABLE 1-continued

Comparison with Simulation for Sheetlike Rectangular Parallelopiped Light Guide (Eout = 0.8)

| (1) | (2) | (3) | (4) | (5) | (6) |
|---|---|---|---|---|---|
| $2 \times 10^4$ | $6.3 \times 10^{-10}$ | $1.9 \times 10^2$ | $64 \times 1 \times 320$ | 79 | 86 |
| $2 \times 10^5$ | $6.3 \times 10^{-8}$ | $3.0 \times 10^1$ | $4 \times 1 \times 20$ | 79 | 90 |
| $2 \times 10^5$ | $6.3 \times 10^{-8}$ | $7.5 \times 10^0$ | $16 \times 1 \times 80$ | 79 | 90 |
| $2 \times 10^5$ | $6.3 \times 10^{-8}$ | $1.9 \times 10^0$ | $64 \times 1 \times 320$ | 79 | 90 |

Notes: Column headings are as follows:
(1) particle diameter (nm);
(2) scattering cross section (m$^2$);
(3) particle density (number/mm$^3$);
(4) dimensions W × T × L$_G$ (mm);
(5) light-output efficiency (%) according to equation (14); and
(6) light-output efficiency (%) by simulation.

TABLE 2

Comparison with Simulation for Sheetlike Rectangular Parallelopiped Light Guide (Eout = 0.7)

| (1) | (2) | (3) | (4) | (5) | (6) |
|---|---|---|---|---|---|
| $2 \times 10^1$ | $1.1 \times 10^{-22}$ | $2.0 \times 10^{13}$ | $4 \times 1 \times 20$ | 78 | 82 |
| $2 \times 10^1$ | $1.1 \times 10^{-22}$ | $5.0 \times 10^{13}$ | $16 \times 1 \times 80$ | 78 | 83 |
| $2 \times 10^1$ | $1.1 \times 10^{-22}$ | $1.3 \times 10^{12}$ | $64 \times 1 \times 320$ | 78 | 83 |
| $2 \times 10^2$ | $1.5 \times 10^{-14}$ | $6.0 \times 10^7$ | $4 \times 1 \times 20$ | 85 | 85 |
| $2 \times 10^2$ | $1.5 \times 10^{-14}$ | $1.5 \times 10^7$ | $16 \times 1 \times 80$ | 85 | 85 |
| $2 \times 10^2$ | $1.5 \times 10^{-14}$ | $3.8 \times 10^6$ | $64 \times 1 \times 320$ | 85 | 84 |
| $2 \times 10^3$ | $12.6 \times 10^{-12}$ | $4.5 \times 10^5$ | $4 \times 1 \times 20$ | 59 | 65 |
| $2 \times 10^3$ | $12.6 \times 10^{-12}$ | $1.1 \times 10^5$ | $16 \times 1 \times 80$ | 59 | 65 |
| $2 \times 10^3$ | $12.6 \times 10^{-12}$ | $2.8 \times 10^4$ | $64 \times 1 \times 320$ | 59 | 58 |
| $2 \times 10^4$ | $6.3 \times 10^{-10}$ | $4.5 \times 10^3$ | $4 \times 1 \times 20$ | 73 | 79 |
| $2 \times 10^4$ | $6.3 \times 10^{-10}$ | $1.1 \times 10^3$ | $16 \times 1 \times 80$ | 73 | 79 |
| $2 \times 10^4$ | $6.3 \times 10^{-10}$ | $2.8 \times 10^2$ | $64 \times 1 \times 320$ | 73 | 70 |
| $2 \times 10^5$ | $6.3 \times 10^{-8}$ | $4.5 \times 10^1$ | $4 \times 1 \times 20$ | 73 | 86 |
| $2 \times 10^5$ | $6.3 \times 10^{-8}$ | $1.1 \times 10^1$ | $16 \times 1 \times 80$ | 73 | 86 |
| $2 \times 10^5$ | $6.3 \times 10^{-8}$ | $2.8 \times 10^0$ | $64 \times 1 \times 320$ | 73 | 78 |

Notes: Column headings are as follows:
(1) particle diameter (nm);
(2) scattering cross section (m$^2$);
(3) particle density (number/mm$^3$);
(4) dimensions W × T × L$_G$ (mm);
(5) light-output efficiency (%) according to equation (14); and
(6) light-output efficiency (%) by simulation.

TABLE 3

Comparison with Simulation for Sheetlike Rectangular Parallelopiped Light Guide (Eout = 0.6)

| (1) | (2) | (3) | (4) | (5) | (6) |
|---|---|---|---|---|---|
| $2 \times 10^1$ | $1.1 \times 10^{-22}$ | $3.2 \times 10^{13}$ | $4 \times 1 \times 20$ | 70 | 78 |
| $2 \times 10^1$ | $1.1 \times 10^{-22}$ | $8.0 \times 10^{12}$ | $16 \times 1 \times 80$ | 70 | 79 |
| $2 \times 10^1$ | $1.1 \times 10^{-22}$ | $2.0 \times 10^{12}$ | $64 \times 1 \times 320$ | 70 | 79 |
| $2 \times 10^2$ | $1.5 \times 10^{-14}$ | $1.2 \times 10^8$ | $4 \times 1 \times 20$ | 79 | 78 |
| $2 \times 10^2$ | $1.5 \times 10^{-14}$ | $3.0 \times 10^7$ | $16 \times 1 \times 80$ | 79 | 78 |
| $2 \times 10^2$ | $1.5 \times 10^{-14}$ | $7.5 \times 10^6$ | $64 \times 1 \times 320$ | 79 | 77 |
| $2 \times 10^3$ | $12.6 \times 10^{-12}$ | $9.0 \times 10^5$ | $4 \times 1 \times 20$ | 37 | 41 |
| $2 \times 10^3$ | $12.6 \times 10^{-12}$ | $2.3 \times 10^5$ | $16 \times 1 \times 80$ | 37 | 40 |
| $2 \times 10^3$ | $12.6 \times 10^{-12}$ | $5.6 \times 10^4$ | $64 \times 1 \times 320$ | 37 | 36 |
| $2 \times 10^4$ | $6.3 \times 10^{-10}$ | $9.0 \times 10^3$ | $4 \times 1 \times 20$ | 59 | 60 |
| $2 \times 10^4$ | $6.3 \times 10^{-10}$ | $2.3 \times 10^3$ | $16 \times 1 \times 80$ | 59 | 60 |
| $2 \times 10^4$ | $6.3 \times 10^{-10}$ | $5.6 \times 10^2$ | $64 \times 1 \times 320$ | 59 | 52 |

TABLE 3-continued

Comparison with Simulation for Sheetlike Rectangular Parallelopiped Light Guide (Eout = 0.6)

| (1) | (2) | (3) | (4) | (5) | (6) |
|---|---|---|---|---|---|
| $2 \times 10^5$ | $6.3 \times 10^{-8}$ | $9.0 \times 10^1$ | $4 \times 1 \times 20$ | 59 | 73 |
| $2 \times 10^5$ | $6.3 \times 10^{-8}$ | $2.3 \times 10^1$ | $16 \times 1 \times 80$ | 59 | 73 |
| $2 \times 10^5$ | $6.3 \times 10^{-8}$ | $5.6 \times 10^0$ | $64 \times 1 \times 320$ | 59 | 64 |

Notes: Column headings are as follows:
(1) particle diameter (nm);
(2) scattering cross section (m$^2$);
(3) particle density (number/mm$^3$);
(4) dimensions W × T × L$_G$ (mm);
(5) light-output efficiency (%) according to equation (14); and
(6) light-output efficiency (%) by simulation.

TABLE 4

Comparison with Simulation for cylindrical Light Guide (Eout = 0.8)

| (1) | (2) | (3) | (4) | (5) | (6) |
|---|---|---|---|---|---|
| $2 \times 10^1$ | $1.1 \times 10^{-22}$ | $6.7 \times 10^{12}$ | $2 \times 30$ | 84 | 87 |
| $2 \times 10^1$ | $1.1 \times 10^{-22}$ | $6.7 \times 10^{11}$ | $20 \times 300$ | 84 | 87 |
| $2 \times 10^2$ | $1.5 \times 10^{-14}$ | $2.0 \times 10^7$ | $2 \times 30$ | 89 | 88 |
| $2 \times 10^2$ | $1.5 \times 10^{-14}$ | $2.0 \times 10^6$ | $20 \times 300$ | 89 | 88 |
| $2 \times 10^3$ | $12.6 \times 10^{-12}$ | $2.0 \times 10^5$ | $2 \times 30$ | 68 | 71 |
| $2 \times 10^3$ | $12.6 \times 10^{-12}$ | $2.0 \times 10^4$ | $20 \times 300$ | 68 | 71 |
| $2 \times 10^4$ | $6.3 \times 10^{-10}$ | $2.0 \times 10^3$ | $2 \times 30$ | 79 | 83 |
| $2 \times 10^4$ | $6.3 \times 10^{-10}$ | $2.0 \times 10^2$ | $20 \times 300$ | 79 | 83 |
| $2 \times 10^5$ | $6.3 \times 10^{-8}$ | $2.0 \times 10^1$ | $2 \times 30$ | 79 | 88 |
| $2 \times 10^5$ | $6.3 \times 10^{-8}$ | $2.0 \times 10^0$ | $20 \times 300$ | 79 | 88 |

Notes: Column headings are as follows:
(1) particle diameter (nm);
(2) scattering cross section (m$^2$);
(3) particle density (number/mm$^3$);
(4) dimensions φ × L$_G$ (mm);
(5) light-output efficiency (%) according to equation (14); and
(6) light-output efficiency (%) by simulation.

TABLE 5

Comparison with Simulation for cylindrical Light Guide (Eout = 0.7)

| (1) | (2) | (3) | (4) | (5) | (6) |
|---|---|---|---|---|---|
| $2 \times 10^1$ | $1.1 \times 10^{-22}$ | $1.3 \times 10^{13}$ | $2 \times 30$ | 78 | 83 |
| $2 \times 10^1$ | $1.1 \times 10^{-22}$ | $1.3 \times 10^{12}$ | $20 \times 300$ | 78 | 82 |
| $2 \times 10^2$ | $1.5 \times 10^{-14}$ | $4.0 \times 10^7$ | $2 \times 30$ | 86 | 84 |
| $2 \times 10^2$ | $1.5 \times 10^{-14}$ | $4.0 \times 10^6$ | $20 \times 300$ | 86 | 84 |
| $2 \times 10^3$ | $12.6 \times 10^{-12}$ | $3.0 \times 10^5$ | $2 \times 30$ | 59 | 59 |
| $2 \times 10^3$ | $12.6 \times 10^{-12}$ | $3.0 \times 10^4$ | $20 \times 300$ | 59 | 59 |
| $2 \times 10^4$ | $6.3 \times 10^{-10}$ | $3.0 \times 10^3$ | $2 \times 30$ | 73 | 75 |
| $2 \times 10^4$ | $6.3 \times 10^{-10}$ | $3.0 \times 10^2$ | $20 \times 300$ | 73 | 74 |
| $2 \times 10^5$ | $6.3 \times 10^{-8}$ | $3.0 \times 10^1$ | $2 \times 30$ | 73 | 83 |
| $2 \times 10^5$ | $6.3 \times 10^{-8}$ | $3.0 \times 10^0$ | $20 \times 300$ | 73 | 83 |

Notes: Column headings are as follows:
(1) particle diameter (nm);
(2) scattering cross section (m$^2$);
(3) particle density (number/mm$^3$);
(4) dimensions φ × L$_G$ (mm);
(5) light-output efficiency (%) according to equation (14); and
(6) light-output efficiency (%) by simulation.

TABLE 6

Comparison with Simulation for cylindrical Light Guide (Eout = 0.6)

| (1) | (2) | (3) | (4) | (5) | (6) |
|---|---|---|---|---|---|
| $2 \times 10^1$ | $1.1 \times 10^{-22}$ | $2.1 \times 10^{13}$ | $2 \times 30$ | 70 | 78 |
| $2 \times 10^1$ | $1.1 \times 10^{-22}$ | $2.1 \times 10^{12}$ | $20 \times 300$ | 70 | 78 |
| $2 \times 10^2$ | $1.5 \times 10^{-14}$ | $1.0 \times 10^8$ | $2 \times 30$ | 79 | 72 |
| $2 \times 10^2$ | $1.5 \times 10^{-14}$ | $1.0 \times 10^7$ | $20 \times 300$ | 79 | 72 |
| $2 \times 10^3$ | $12.6 \times 10^{-12}$ | $5.1 \times 10^5$ | $2 \times 30$ | 44 | 40 |
| $2 \times 10^3$ | $12.6 \times 10^{-12}$ | $5.1 \times 10^4$ | $20 \times 300$ | 44 | 41 |
| $2 \times 10^4$ | $6.3 \times 10^{-10}$ | $5.1 \times 10^3$ | $2 \times 30$ | 65 | 59 |
| $2 \times 10^4$ | $6.3 \times 10^{-10}$ | $5.1 \times 10^2$ | $20 \times 300$ | 65 | 59 |
| $2 \times 10^5$ | $6.3 \times 10^{-8}$ | $5.1 \times 10^1$ | $2 \times 30$ | 65 | 72 |
| $2 \times 10^5$ | $6.3 \times 10^{-8}$ | $5.1 \times 10^0$ | $20 \times 300$ | 65 | 72 |

Notes: Column headings are as follows:
(1) particle diameter (nm);
(2) scattering cross section (m$^2$);
(3) particle density (number/mm$^3$);
(4) dimensions $\phi \times L_G$ (mm);
(5) light-output efficiency (%) according to equation (14); and
(6) light-output efficiency (%) by simulation.

TABLE 7

Comparison with Simulation for Rectangular Parallelopiped Light Guide (Eout = 0.8)

| (1) | (2) | (3) | (4) | (5) | (6) |
|---|---|---|---|---|---|
| $2 \times 10^1$ | $1.1 \times 10^{-22}$ | $2.5 \times 10^{12}$ | $50 \times 50 \times 80$ | 84 | 88 |
| $2 \times 10^2$ | $1.5 \times 10^{-14}$ | $7.5 \times 10^6$ | $50 \times 50 \times 80$ | 89 | 88 |
| $2 \times 10^3$ | $12.6 \times 10^{-12}$ | $7.5 \times 10^4$ | $50 \times 50 \times 80$ | 68 | 71 |
| $2 \times 10^4$ | $6.3 \times 10^{-10}$ | $7.5 \times 10^2$ | $50 \times 50 \times 80$ | 79 | 81 |
| $2 \times 10^5$ | $6.3 \times 10^{-8}$ | $7.5 \times 10^0$ | $50 \times 50 \times 80$ | 79 | 86 |

Notes: Column headings are as follows:
(1) particle diameter (nm);
(2) scattering cross section (m$^2$);
(3) particle density (number/mm$^3$);
(4) dimensions $W \times T \times L_G$ (mm);
(5) light-output efficiency (%) according to equation (14); and
(6) light-output efficiency (%) by simulation.

TABLE 8

Comparison with Simulation for Rectangular Parallelopiped Light Guide (Eout = 0.7)

| (1) | (2) | (3) | (4) | (5) | (6) |
|---|---|---|---|---|---|
| $2 \times 10^1$ | $1.1 \times 10^{-22}$ | $5.0 \times 10^{12}$ | $50 \times 50 \times 80$ | 78 | 84 |
| $2 \times 10^2$ | $1.5 \times 10^{-14}$ | $1.4 \times 10^7$ | $50 \times 50 \times 80$ | 86 | 85 |
| $2 \times 10^3$ | $12.6 \times 10^{-12}$ | $1.4 \times 10^5$ | $50 \times 50 \times 80$ | 53 | 57 |
| $2 \times 10^4$ | $6.3 \times 10^{-10}$ | $1.4 \times 10^3$ | $50 \times 50 \times 80$ | 70 | 70 |
| $2 \times 10^5$ | $6.3 \times 10^{-8}$ | $1.4 \times 10^1$ | $50 \times 50 \times 80$ | 70 | 78 |

Notes: Column headings are as follows:
(1) particle diameter (nm);
(2) scattering cross section (m$^2$);
(3) particle density (number/mm$^3$);
(4) dimensions $W \times T \times L_G$ (mm);
(5) light-output efficiency (%) according to equation (14); and
(6) light-output efficiency (%) by simulation.

TABLE 9

Comparison with Simulation for Rectangular Parallelopiped Light Guide (Eout = 0.6)

| (1) | (2) | (3) | (4) | (5) | (6) |
|---|---|---|---|---|---|
| $2 \times 10^1$ | $1.1 \times 10^{-22}$ | $8.0 \times 10^{12}$ | $50 \times 50 \times 80$ | 70 | 78 |
| $2 \times 10^2$ | $1.5 \times 10^{-14}$ | $2.3 \times 10^7$ | $50 \times 50 \times 80$ | 82 | 80 |
| $2 \times 10^3$ | $12.6 \times 10^{-12}$ | $2.3 \times 10^5$ | $50 \times 50 \times 80$ | 37 | 43 |
| $2 \times 10^4$ | $6.3 \times 10^{-10}$ | $2.3 \times 10^3$ | $50 \times 50 \times 80$ | 58 | 58 |
| $2 \times 10^5$ | $6.3 \times 10^{-8}$ | $2.3 \times 10^1$ | $50 \times 50 \times 80$ | 58 | 68 |

Notes: Column headings are as follows:
(1) particle diameter (nm);
(2) scattering cross section (m$^2$);
(3) particle density (number/mm$^3$);
(4) dimensions $W \times T \times L_G$ (mm);
(5) light-output efficiency (%) according to equation (14); and
(6) light-output efficiency (%) by simulation.

What is claimed is:

1. A method for designing a light guide in which light-scattering particles are contained in an optical medium so that light which enters the light guide from a first end face can propagate to a second end face while being scattered by the light-scattering particles, comprising the steps of:

(a) determining a desired value of a light-output efficiency of the light guide; and (b) determining values of a scattering cross section $\Phi$ of each of said light-scattering particles, a density $N_p$ of the light-scattering particles in the optical medium, and a length $L_G$ of the optical medium in a light propagation direction so as to satisfy a relationship, $$E_{out} = \exp\{-(\Phi \cdot N_p \cdot L_G \cdot K_c)\} \cdot K_L,$$

where $K_c$ and $K_L$ are a correction coefficient and a loss coefficient of the light guide, respectively.

2. A light guide comprising:

an optical medium having first and second end faces and a length $L_G$ in a light propagation direction; and light-scattering particles each having a scattering cross section $\Phi$ and being contained in said optical medium with a density $N_p$ so that light which enters the light guide from said first end face can propagate to said second end face while being scattered by the light-scattering particles;

wherein a product of the scattering cross section $\Phi$, the density $N_p$, the length $L_G$, and a correction coefficient $K_c$ is less than or equal to 0.9.

3. A light guide according to claim 2, wherein said product is less than or equal to 0.4.

4. A light guide according to claim 2, wherein light incident in the optical medium is repeatedly reflected at the surfaces thereof except at the first and second end faces according to Snell's Law; the refractive index of the optical medium is designated as Nm, the refractive index of the ambient medium is designated as Ns, the incident angle is designated as θm, and the angle of refraction is designated as θs; and in the case that the optical medium does not contain the light scattering particles, if Nm·sinθm=Ns sinθs, then the optical medium is formed to be of a shape so as to satisfy the condition, sinθs>1.

5. A light guide according to claim 3, wherein said light incident in the optical medium is repeatedly reflected at the surfaces thereof except at the first and second end faces according to Snell's Law; the refractive index of the optical medium is designated as Nm, the refractive index of the ambient medium is designated as Ns, the incident angle is designated as θm, and the angle of refraction is designated as θs; and in the case that the optical medium does not contain the light scattering particles, if Nm·sinθmm=Ns·sinθs, then the optical medium is formed to be of a shape so as to satisfy the condition, sinθs>1.

6. A light guide according to claim 2, wherein said light-scattering particles are non-magnetic conductive particles which behave in accordance with Mie's scattering theory.

7. A light guide according to claim 3, wherein said light-scattering particles are non-magnetic conductive particles which behave in accordance with Mie's scattering theory.

8. A light guide according to claim 4, wherein said light-scattering particles are non-magnetic conductive particles which behave in accordance with Mie's scattering theory.

9. A light guide according to claim 5, wherein said light-scattering particles are non-magnetic conductive particles which behave in accordance with Mie's scattering theory.

10. A light guide according to claim 2, wherein said density of said light-scattering particles gradually varies in the optical medium.

11. A light guide according to claim 3, wherein said density of said light-scattering particles gradually varies in the optical medium.

12. A light guide according to claim 4, wherein said density of said light-scattering particles gradually varies in the optical medium.

13. A light guide according to claim 5, wherein said density of said light-scattering particles gradually varies in the optical medium.

14. A light guide according to claim 6, wherein said density of said light-scattering particles gradually varies in the optical medium.

15. A light guide according to claim 2, wherein said optical medium is realized by combining a plurality of optical mediums.

16. A light guide according to claim 3, wherein said optical medium is realized by combining a plurality of optical mediums.

17. A light guide according to claim 4, wherein said optical medium is realized by combining a plurality of optical mediums.

18. A light guide according to claim 5, wherein said optical medium is realized by combining a plurality of optical mediums.

19. A light guide according to claim 6, wherein said optical medium is realized by combining a plurality of optical mediums.

20. A light guide according to claim 10, wherein said optical medium is realized by combining a plurality of optical mediums.

* * * * *